United States Patent
Katayama et al.

(10) Patent No.: US 12,134,967 B2
(45) Date of Patent: Nov. 5, 2024

(54) PARK POSITION FOR A SURVEY TOOL

(71) Applicant: Schlumberger Technology Corporation, Sugar Land, TX (US)

(72) Inventors: Makito Katayama, Cheltenham (GB); Julien Steimetz, Bristol (GB); Joffroy Dominique Daniel Urbain, Cheltenham (GB); Zainab Orooq, Stonehouse (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 18/264,373

(22) PCT Filed: Feb. 23, 2022

(86) PCT No.: PCT/US2022/070786
§ 371 (c)(1),
(2) Date: Aug. 4, 2023

(87) PCT Pub. No.: WO2022/183182
PCT Pub. Date: Sep. 1, 2022

(65) Prior Publication Data
US 2024/0102379 A1 Mar. 28, 2024

Related U.S. Application Data

(60) Provisional application No. 63/152,933, filed on Feb. 24, 2021.

(51) Int. Cl.
*E21B 47/024* (2006.01)
(52) U.S. Cl.
CPC ................................. *E21B 47/024* (2013.01)

(58) Field of Classification Search
CPC .... E21B 47/024; E21B 2200/20; E21B 47/01; E21B 47/0236; E21B 44/00
See application file for complete search history.

(56) References Cited

U.S. PATENT DOCUMENTS

| | | | |
|---|---|---|---|
| 9,015,952 B2 | 4/2015 | Magosaki | |
| 2009/0119937 A1 | 5/2009 | Watson | |
| 2010/0077623 A1 | 4/2010 | Imamura | |
| 2010/0258321 A1 | 10/2010 | Igarashi | |
| 2015/0052988 A1* | 2/2015 | Price | E21B 49/003 73/152.17 |
| 2017/0284188 A1 | 10/2017 | Igarashi | |
| 2017/0306747 A1 | 10/2017 | Parfitt | |

OTHER PUBLICATIONS

International Search Report and Written Opinion issued in International Patent application PCT/US2022/070786 on Jun. 14, 2022, 9 pages.
Yang, H. et al., "A Novel Tri-Axial MEMS Gyroscope Calibration Model over a Full Temperature Range", Sensors (Basel), 2018, 18(9), 15 pages.

* cited by examiner

*Primary Examiner* — Steven A Macdonald
(74) *Attorney, Agent, or Firm* — Jeffrey D. Frantz

(57) ABSTRACT

A gyroscope assembly is maintained in a park position during drilling activities. In the park position, a sensitive axis of a gyroscope in the gyroscope assembly is perpendicular or approximately perpendicular to a longitudinal axis of a downhole tool. Maintaining the park position during drilling activities reduces the drift bias caused by overloading the input signal of the gyroscope due to rotation of the downhole tool.

20 Claims, 11 Drawing Sheets

PARK POSITION FOR A SURVEY TOOL

CROSS-REFERENCE TO RELATED APPLICATIONS

This application is the National Stage Entry of International Application No. PCT/US2022/070786, filed Feb. 23, 2022, which claims the benefit of, and priority to, U.S. Patent Application No. 63/152,933, filed Feb. 24, 2021, and titled "Park Position for a Survey Tool", which application is expressly incorporated herein by this reference in its entirety.

BACKGROUND

Modern drilling operations may change the trajectory of a wellbore through the process of directional drilling. While drilling, it may become necessary to determine the location and/or drilling trajectory. Survey instruments located on a downhole tool may be used to measure azimuth, inclination, and other survey information. At least one survey instrument may include a gyroscopic sensor, such as a Micro-Electro-Mechanical Systems (MEMS) gyroscope. The MEMS gyroscope may be located on a downhole tool, such as at a bottomhole assembly (BHA). A MEMS gyroscope may include a single gyroscope assembly that is rotated about 6 axes to collect downhole tool motion data. A downhole tool may further include one or more accelerometers that measure acceleration data about one or more axes. Using one or both of the gyroscopic motion data and the accelerometer acceleration data, the downhole tool may determine direction information, including azimuth and/or inclination of the downhole tool.

SUMMARY

In some embodiments, a method for stabilizing a gyroscope assembly while drilling includes rotating a downhole tool about a longitudinal axis. The gyroscope assembly is located on the downhole tool and includes a gyroscope. The gyroscope assembly is rotated to a park position. The gyroscope assembly is maintained in the park position while rotating the downhole tool. A misalignment of the gyroscope is determined with respect to the gyroscope housing, and the park position is adjusted based on the misalignment of the gyroscope assembly.

In some embodiments, a system for determining downhole direction includes a housing having a longitudinal axis. A gyroscope assembly includes a drive shaft rotatable about the longitudinal axis. An arm member is connected to the drive shaft and an shell shaft is connected to the arm member. The drive shaft includes a counter arm to mass balance the drive shaft. A shell is rotatable about the shell shaft, with a gyroscope located in the shell. A position sensor determines a position of the gyroscope assembly.

This summary is provided to introduce a selection of concepts that are further described in the detailed description. This summary is not intended to identify key or essential features of the claimed subject matter, nor is it intended to be used as an aid in limiting the scope of the claimed subject matter. Additional features and aspects of embodiments of the disclosure will be set forth herein, and in part will be obvious from the description, or may be learned by the practice of such embodiments.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which.

FIGS. 5-1 and FIG. 5-2 are cross-sectional views of a survey tool having a MEMS gyroscope assembly in a first position and in a park position, according to at least one embodiment of the present disclosure;

FIG. 6-1 is a cross-sectional view of another survey tool, according to at least one embodiment of the present disclosure;

FIG. 6-2 is an end view of the survey tool of FIG. 6-1, according to at least one embodiment of the present disclosure;

FIG. 6-3 is an end-view of another survey tool, according to at least one embodiment of the present disclosure;

DETAILED DESCRIPTION

This disclosure generally relates to devices, systems, and methods for reducing gyroscopic bias drift on a gyroscope sensor, such as a MEMS gyroscope. The gyroscope is located within the housing of a downhole tool, and the downhole tool is rotatable about a longitudinal axis while the gyroscope is independently rotatable about a gyroscope axis During drilling operations (e.g., while the downhole tool is rotating), the gyroscope may be placed in a park position so that the gyroscope is oriented approximately perpendicular to the longitudinal axis. Parking the gyroscope perpendicular to the longitudinal axis may reduce or even prevent abnormal behavior of the gyroscope, such as bias drift, caused by sensor input overload while the downhole tool is rotating. Reducing and/or preventing bias drift of the gyroscope may improve the accuracy and reliability of the downhole survey performed by the gyroscope assembly.

Figure 1:
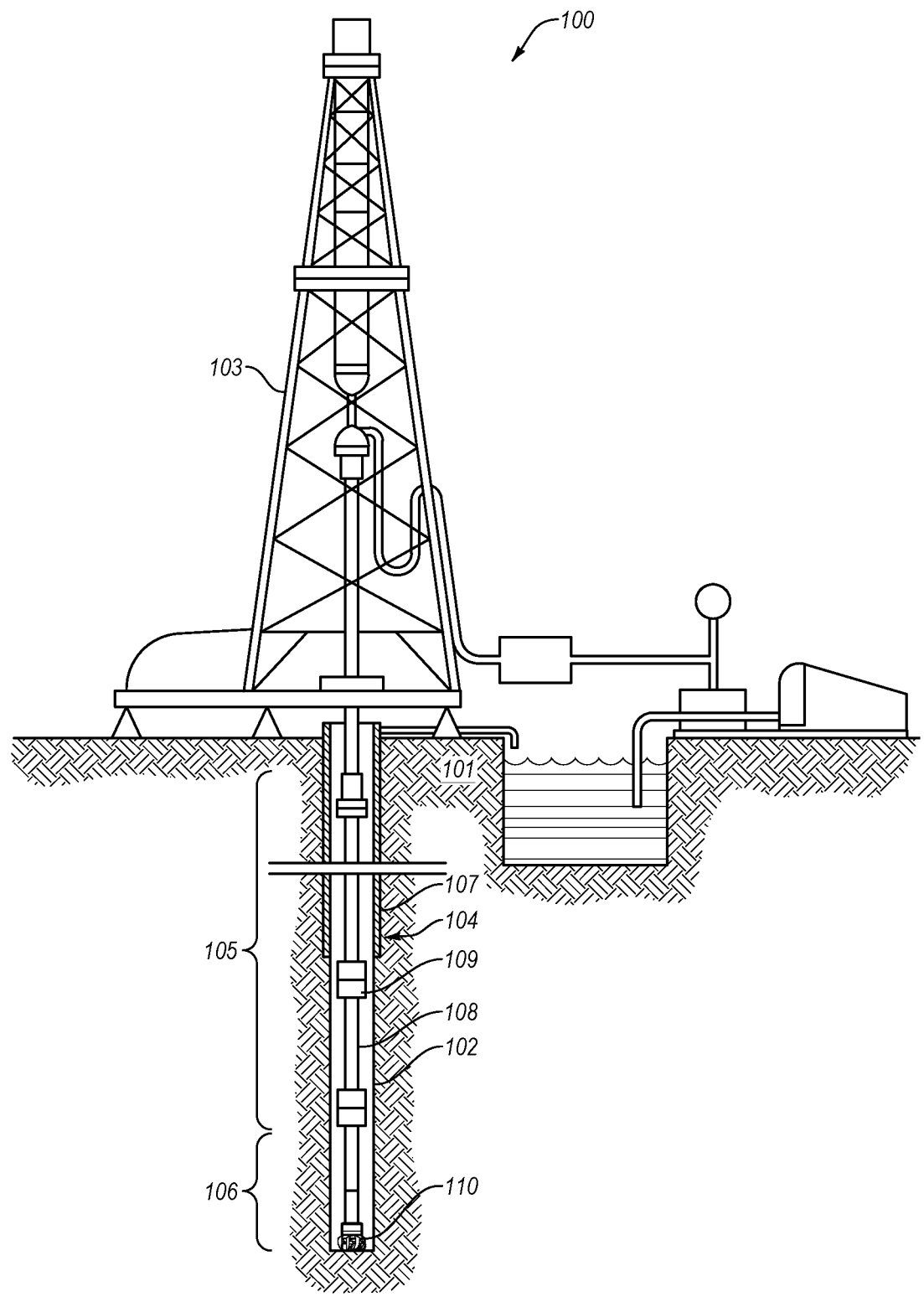
FIG. 1 is a schematic view of a drilling system, according to at least one embodiment of the present disclosure.

FIG. 1 shows one example of a drilling system 100 for drilling an earth formation 101 to form a wellbore 102. The drilling system 100 includes a drill rig 103 used to turn a drilling tool assembly 104 which extends downward into the wellbore 102. The drilling tool assembly 104 may include a drill string 105, a BHA 106, and a bit 110, attached to the downhole end of drill string 105.

The drill string 105 may include several joints of drill pipe 108 connected end-to-end through tool joints 109. The drill string 105 transmits drilling fluid through a central bore and transmits rotational power from the drill rig 103 to the BHA 106. In some embodiments, the drill string 105 may further include additional components such as subs, pup joints, etc. The drill pipe 108 provides a hydraulic passage through which drilling fluid is pumped from the surface. The drilling fluid discharges through selected-size nozzles, jets, or other orifices in the bit 110 for the purposes of cooling the bit 110 and cutting structures thereon, and for lifting cuttings out of the wellbore 102 as it is being drilled.

The BHA 106 may include the bit 110 or other components. An example BHA 106 may include additional or other components (e.g., coupled between to the drill string 105 and the bit 110). Examples of additional BHA components include drill collars, stabilizers, measurement-while-drilling (MWD) tools, logging-while-drilling (LWD) tools, downhole motors, underreamers, section mills, hydraulic disconnects, jars, vibration or dampening tools, other components, or combinations of the foregoing. The BHA 106 may further include a rotary steerable system (RSS). The RSS may include directional drilling tools that change a direction of the bit 110, and thereby the trajectory of the wellbore. At least a portion of the RSS may maintain a geostationary position relative to an absolute reference frame, such as gravity, magnetic north, and/or true north. Using measurements obtained with the geostationary position, the RSS may locate the bit 110, change the course of the bit 110, and direct the directional drilling tools on a projected trajectory. In some embodiments, the RSS may not include a geostationary portion, and control units, sensor units, or other features may rotate with the steering elements.

The BHA 106 may further include one or more survey tools to determine directional information about the BHA 106 and/or the bit 110. In some embodiments, the survey tools may be an independent sub on the BHA 106. In some embodiments, the survey tools may be located on a downhole tool on the BHA 106. For example, the survey tools may be located on the MWD or the LWD tools, or on or within another collar of a BHA tool or the RSS. In some embodiments, the survey tools may be located on a geostationary portion of the RSS.

In some embodiments, the survey tools may include one or more gyroscopes. Examples of types of gyroscopes that may be used in connection with survey tools of the present disclosure include MEMS gyroscopes, optical gyroscopes (e.g., fiber optic gyroscopes), ring laser gyroscopes, mechanical gyroscopes, gas-bearing gyroscopes, of the like. The gyroscope may be used to determine the downhole direction and/or inclination of the BHA 106 and/or the bit 110. In some cases, rotation of the BHA 106, vibration, or other downhole motion may overload the receivers of the gyroscope, causing abnormal behavior of the gyroscope, such as bias drift in the measurements. This may result in reduced accuracy of the survey. To reduce and/or prevent drift caused by overloading of the gyroscope, the gyroscope may be parked in a park position. The park position of the gyroscope may be perpendicular to the longitudinal axis. This may reduce the magnitude of the input to the gyroscope, thereby reducing and/or eliminating the sensor overload bias of the gyroscope.

In general, the drilling system 100 may include other drilling components and accessories, such as special valves (e.g., kelly cocks, blowout preventers, and safety valves). Additional components included in the drilling system 100 may be considered a part of the drilling tool assembly 104, the drill string 105, or a part of the BHA 106 depending on their locations in the drilling system 100.

The bit 110 in the BHA 106 may be any type of bit suitable for degrading downhole materials. For instance, the bit 110 may be a drill bit suitable for drilling the earth formation 101. Example types of drill bits used for drilling earth formations are fixed-cutter or drag bits, roller cone bits, percussion hammer bits, coring bits, other bits, and combinations thereof (e.g., hybrid roller cone and fixed-cutter bits). In other embodiments, the bit 110 may be a mill used for removing metal, composite, elastomer, other materials downhole, or combinations thereof. For instance, the bit 110 may be used with a whipstock to mill into casing 107 lining the wellbore 102. The bit 110 may also be a junk mill used to mill away tools, plugs, cement, other materials within the wellbore 102, or combinations thereof swarf or other cuttings formed by use of a mill may be lifted to surface, or may be allowed to fall downhole.

Figure 2:
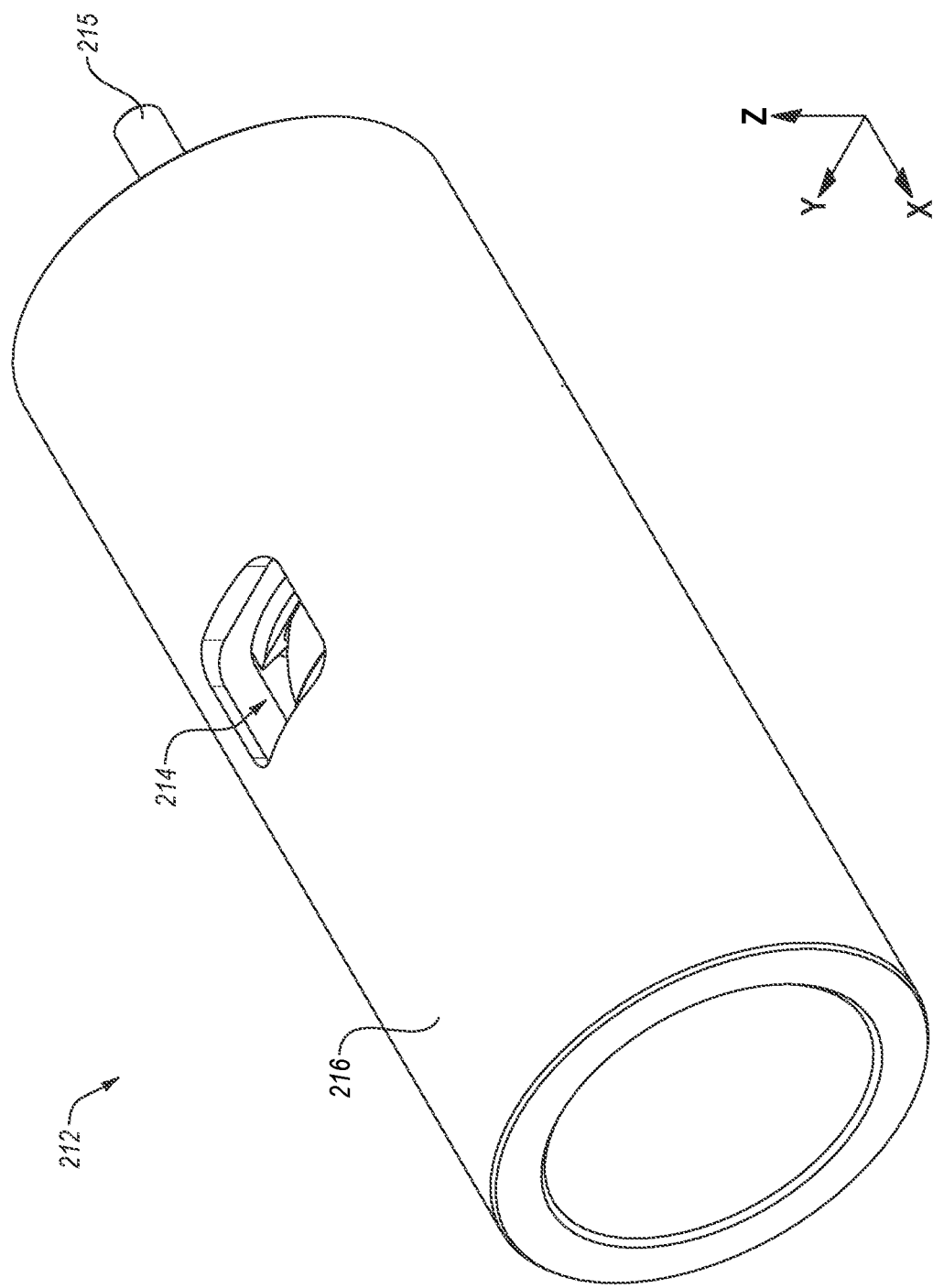
FIG. 2 is a perspective view of a survey tool, according to at least one embodiment of the present disclosure.

FIG. 2 is a perspective view of a survey tool 212 housing a gyroscope assembly 214, according to at least one embodiment of the present disclosure. The gyroscope assembly 214 may be rotatable within a housing 216 of the survey tool 212 by rotating a drive shaft 215 about a longitudinal axis (e.g., the X axis shown in FIG. 2) of the housing. In some embodiments, the housing 216 of the survey tool 212 may be located within another downhole tool, such as a downhole tool as part of a BHA (e.g., the BHA 106). In some embodiments, the housing 216 may be a part of the BHA.

In some embodiments, the housing 216 may be oriented with the downhole tool, such that the longitudinal axis is parallel with a longitudinal axis of the downhole tool. The orientation of the housing 216 may be determined relative to the X, Y, and Z axes shown in FIG. 2, with the X axis being the longitudinal axis, the Z axis being perpendicular to the X axis and parallel to the force of gravity, and the Y axis being perpendicular to both the X axis and the Z axis.

Figure 3:
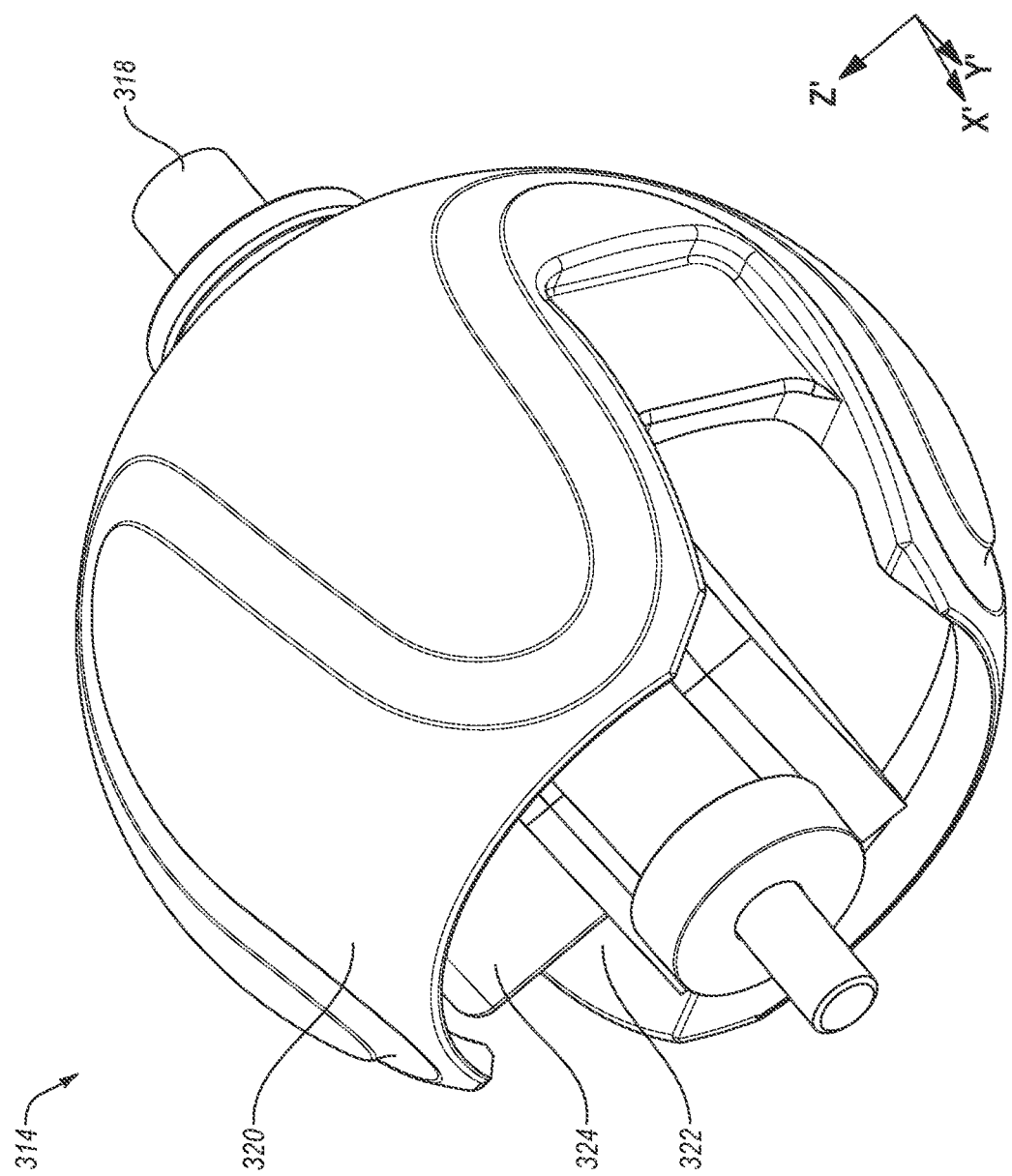
FIG. 3 is a perspective view of a gyroscope assembly, according to at least one embodiment of the present disclosure.

FIG. 3 is a perspective view of a gyroscope assembly 314, according to at least one embodiment of the present disclosure. The gyroscope assembly 314 includes an shell shaft 318 that extends through a shell 320, and about which the shell 320 can rotate. Inside the shell 320 are one or more sensor platforms 322, and at least one gyroscope 324 can be mounted on one or more of the sensor platforms 322. Other sensors may be mounted on the sensor platforms 322, such as accelerometers or position detectors. The shell 320, including the enclosed gyroscope 324 and other sensor platforms, may rotate about the shell shaft 318 along an inclined axis (e.g., the X' axis shown in FIG. 3). The orientation of the gyroscope assembly 314 may be determined relative to the X', Y', and Z' axes shown in FIG. 3.

Figure 4:
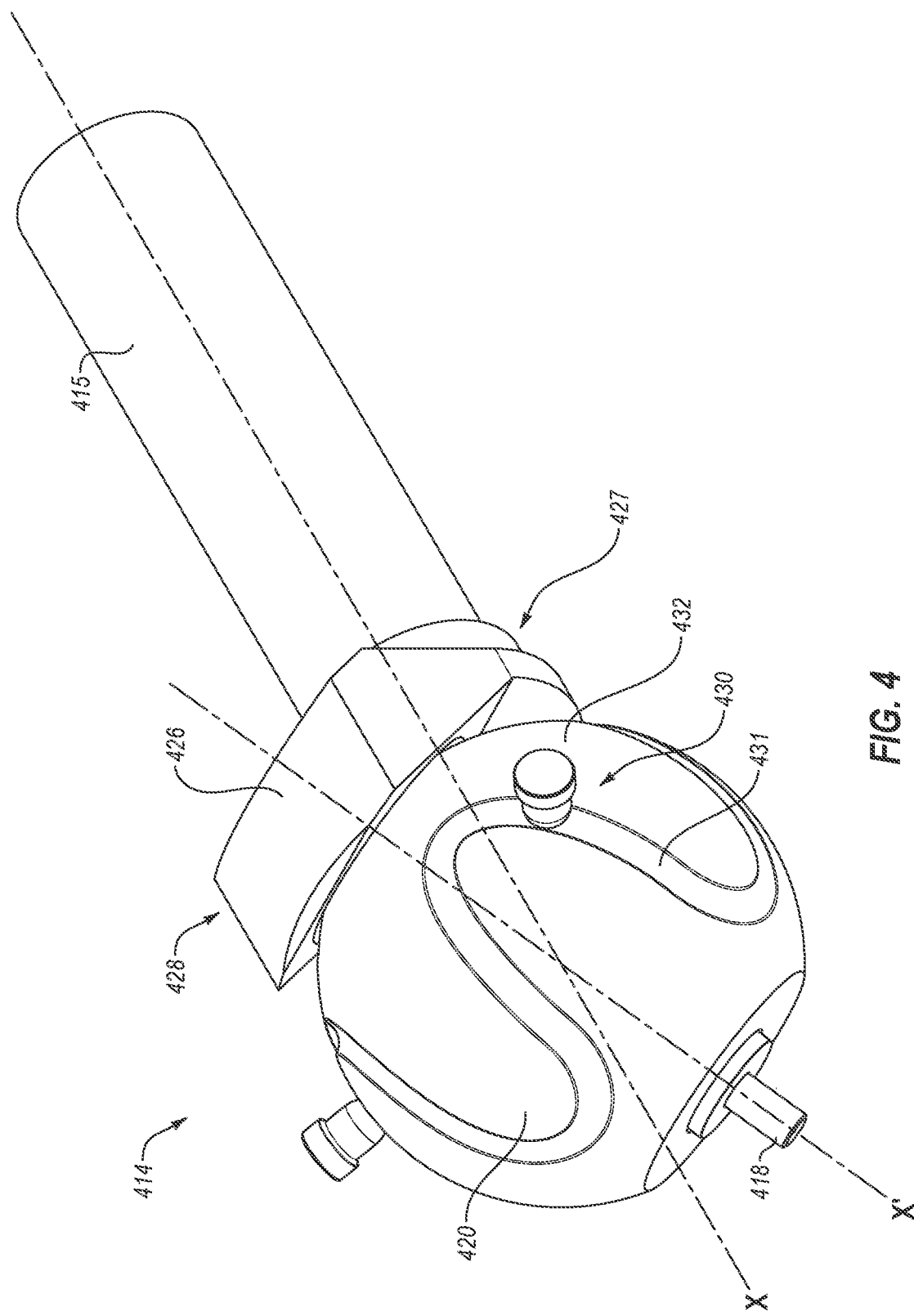
FIG. 4 is a perspective view of another gyroscope assembly, according to at least one embodiment of the present disclosure.

FIG. 4 is a perspective view of a gyroscope assembly 414 that has been removed from its housing (e.g., the housing 216 of FIG. 2), according to at least one embodiment of the present disclosure. A shell 420 housing a gyroscope (not shown) is mounted to a drive shaft 415 by an arm member 426. The arm member 426 is connected to the drive shaft 415 at a proximal end 427 and extends radially away from the drive shaft 415 to a distal end 428. A shell shaft 418 may be connected to the distal end 428 of the drive shaft 415. The shell shaft 418 may extend fully or partially through the shell 420, and the shell 420 may be rotatable around the shell shaft 418 that defines the X' axis.

The gyroscope assembly 414 is rotated by a drive shaft 415 about the X axis. As the drive shaft 415 rotates about the X axis, an indexing system 430 may cause the shell 420 to rotate around the shell shaft 418 about the X' axis. The indexing system 430 may include an indexing groove 431 on the outer surface of the shell 420. One or more indexing pins 432, rollers, or other devices may be directly or indirectly fixed to the housing and extend into the indexing groove 431. As the drive shaft 415 rotates relative to the housing, the arm member 426 and shell 420 also rotate about the X axis. At the same time, contact of the indexing pins 432 with the indexing groove 431 may cause the shell 420 to rotate about the X' axis.

As may be seen, the X axis and the X' axis are not the same. Indeed, the orientation of the shell 420 (including X' axis, and the associated Y' and Z' axes shown in FIG. 3), changes relative to the X axis (and the associated Y and Z axes shown in FIG. 2). The gyroscope and/or the accelerometers housed within the shell 420 may collect position information as the shell 420 rotates. By analyzing the differences in the sensed directional information, the azimuth and/or inclination of the downhole tool may be determined. In some embodiments, the combined rotation of the shell 420 about the shell shaft 418 may allow freedom of movement to perform 6-axis surveys. In some embodiments, the combined rotation of the shell 420 may allow a single gyroscope (e.g., a MEMS gyroscope) to perform a 6-axis survey.

Figures 1, 5:
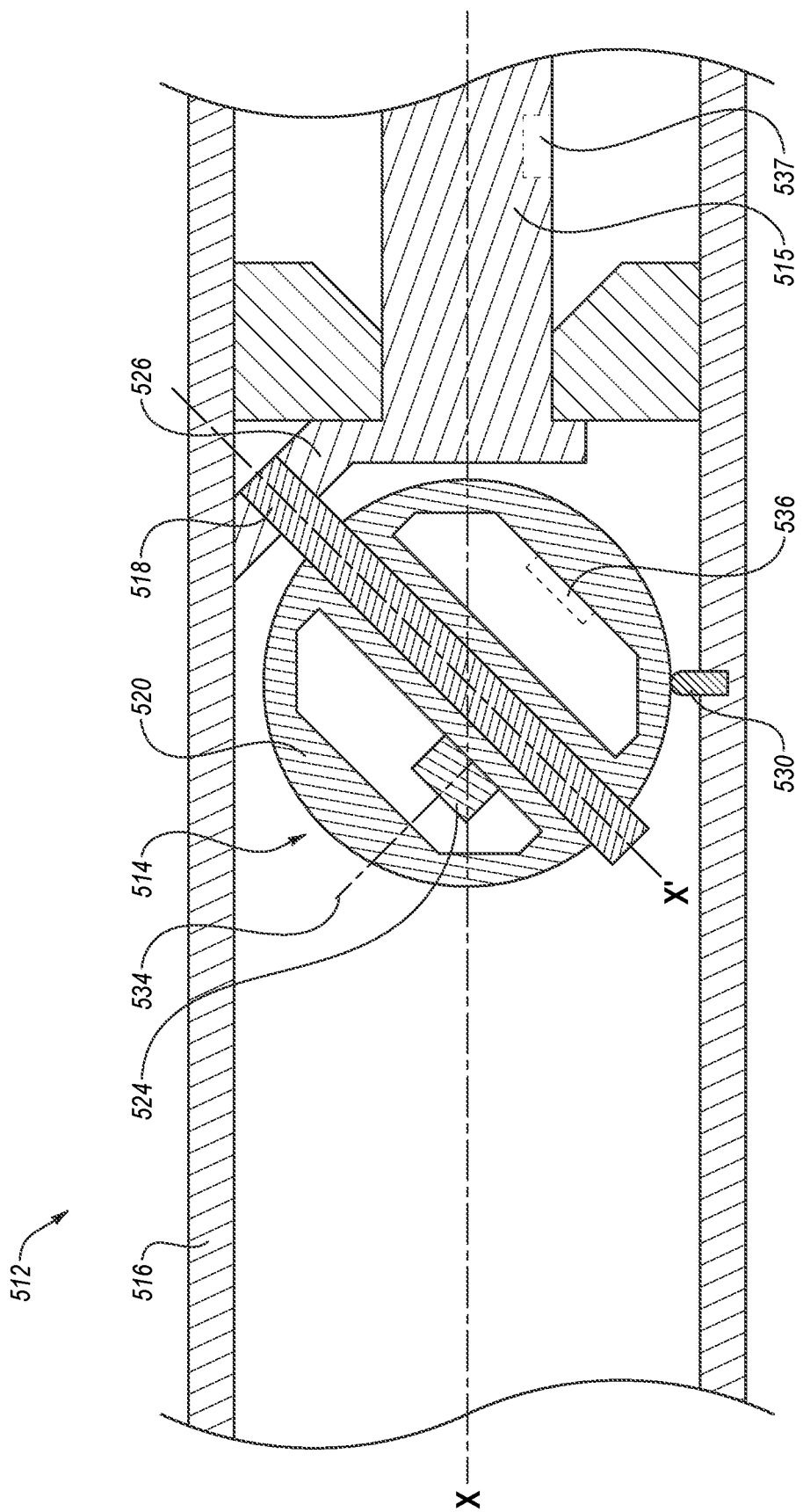
Figures 2, 5:
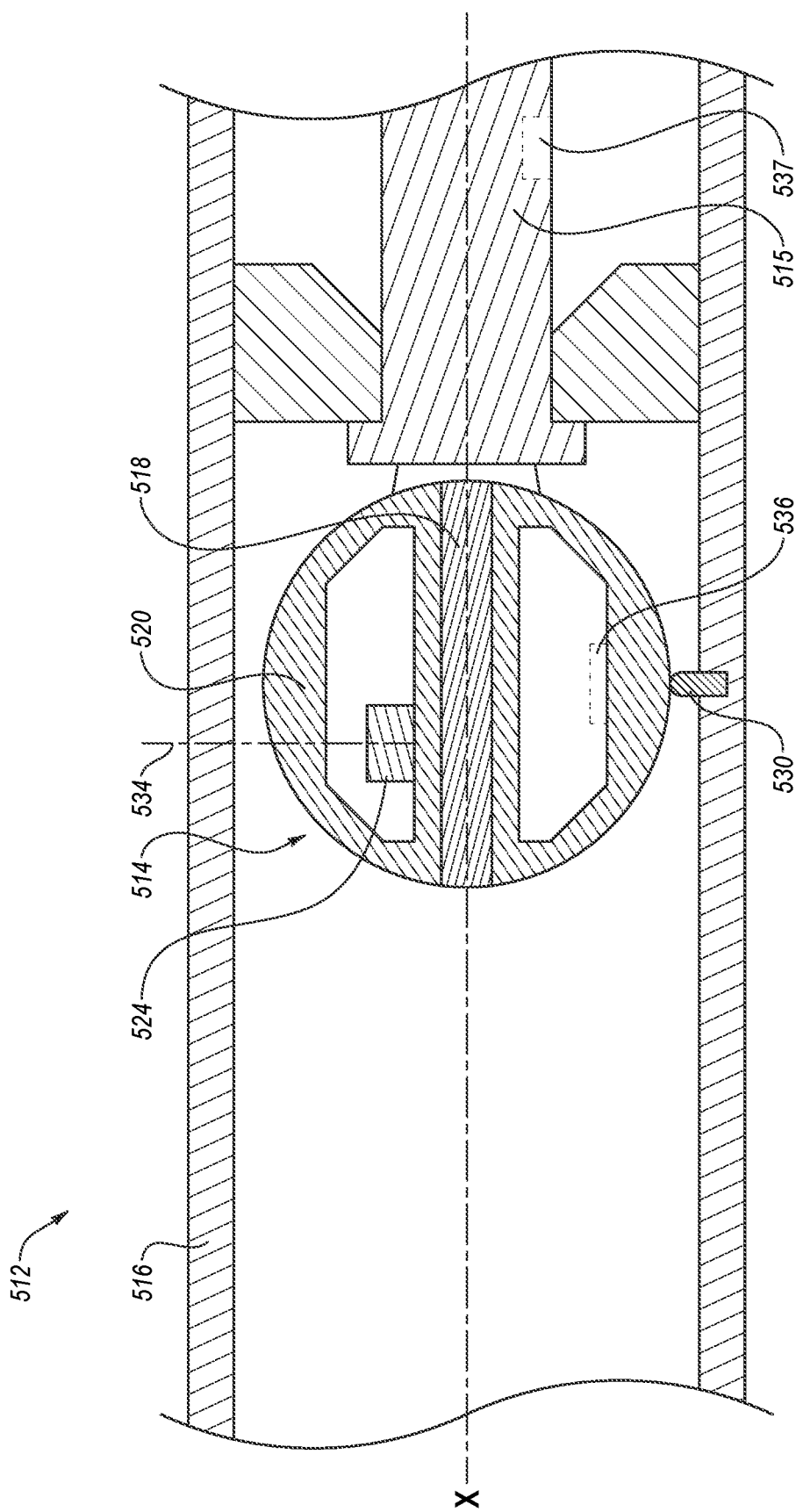

FIG. 5-1 is a cross-sectional view of a survey tool 512 in an arbitrary rotational position, according to at least one embodiment of the present disclosure. As discussed above with respect to FIG. 4, a gyroscope assembly 514 is rotated by a drive shaft 515 about the X axis, which is shown as the rotational axis of the drive shaft 515. Furthermore, the X axis may be the longitudinal axis of the housing 516. In some embodiments, as discussed herein, the housing 516 may be mounted within a downhole tool, such as an MWD or an LWD. In some embodiments, the X axis (e.g., the longitudinal axis of the housing 516) may be the same as the longitudinal axis of the downhole tool. Thus, when the downhole tool or BHA rotates during drilling operations, the downhole tool may rotate about the X axis. In some embodiments, the X axis may be parallel to, but not the same as, the longitudinal axis of the downhole tool. Thus, during drilling operations, the X axis may be radially offset from and rotate about the longitudinal axis of the downhole tool.

Rotation of the drive shaft 515 will rotate the connected arm member 526. This may cause the shell shaft 518, which is inclined relative to the drive shaft 515, to rotate about the X axis, thereby changing the orientation of the shell shaft 518 relative to the X axis. The shell 520 (and the enclosed MEMS gyroscope or other type of gyroscope 524 and other survey tools or sensors) may be rotated about the X axis while also rotating about the X' axis of the shell shaft 518 by the indexing system 530. By collecting survey measurements during rotation of the gyroscope 524 about the X axis and the X' axis, position information of the housing 516 (e.g., directional, azimuth, or inclination information) may be determined.

A directional survey can be performed when the downhole tool in which the survey tool 512 is housed is not rotating. Put another way, a directional survey can be performed during a pause in downhole drilling activities. For example, a directional survey may be performed when a new drill pipe is being added to the drill string. This may be to reduce the amount of noise in the survey measurements caused by rotation and/or vibration of the survey tool 512. Such a survey may be referred to as a static survey, or a pumps-off survey when the fluid being pumped through the downhole tools has been stopped by turning off pumps at the surface.

During drilling operations, the housing 516 of the survey tool 512 may rotate with the downhole tool. This may cause the gyroscope assembly 514 to rotate, thus also changing the orientation of the gyroscope 524 relative to the subsurface formation. This change in orientation of the gyroscope 524 may result in a change in sensor readings of the MEMS gyroscope 524. As the downhole tool rotates, it may also vibrate, jolt, bump, jostle, or otherwise move the MEMS gyroscope 524, which can also generate sensor readings.

Sensor readings collected by the gyroscope 524 while the downhole tool is rotating and otherwise moving may be large. In some embodiments, the sensor readings may be larger than sensor readings that occur when collecting directional survey information. In some embodiments, the sensor readings may overload the gyroscope 524 and/or the gyroscope receptors. This may cause an instability of bias of the gyroscope 524. Changing the bias of the MEMS gyroscope 524 may reduce the accuracy of the survey results. For example the gyroscope 524 may be calibrated before use by evaluating an existing bias. Drift or other instability of that bias as a result of downhole vibration, rotation, shock, etc. may then require re-calibrations to obtain the same accuracy.

The sensor readings from the gyroscope 524 may change based on the orientation of the gyroscope 524 relative to the X axis (e.g., the longitudinal axis of the housing 516). Different orientations may result in different sizes or magnitudes of readings. For example, the gyroscope 524 has a sensitivity axis 534. The sensitivity axis 534 may be oriented perpendicular to or approximately perpendicular to the X' axis (e.g., the rotational axis of the shell 520, or the axis of the shell shaft 518). In some embodiments, the sensitivity axis 534 may be or define the Z' axis of the gyroscope assembly 514 (e.g., the Z' axis shown in FIG. 3). The magnitude of the sensor readings may be determined based on the orientation of the sensitivity axis 534.

In accordance with embodiments of the present disclosure, to reduce the chance of overload of the gyroscope 524 and reduce the gyroscope bias drift, an operator may reduce the magnitude of the sensor measurements collected by the gyroscope 524 during drilling activities. Reducing the magnitude of the sensor measurements during drilling activities may include controlling the orientation of the gyroscope 524 during the drilling activities. To minimize the sensor measurements, the gyroscope 524 may be maintained in a park position when controlling the orientation of the gyroscope 524. The park position may be a rotational orientation of the gyroscope 524 (and the sensitivity axis 534) that is designed and arranged to minimize the magnitude of sensor measurements during drilling or other activities.

In some embodiments, the park position may be the position in which the gyroscope 524 is oriented perpendicular or approximately perpendicular to the X axis (e.g., the longitudinal axis of the housing 516, the rotational axis of the drive shaft 515, the longitudinal axis of the downhole tool). For example, in a park position, the gyroscope sensitivity axis 534 may be perpendicular or approximately perpendicular to the X axis.

To reach the park position, the drive shaft 515 may be rotated, thereby causing the shell shaft 518 to change orientation. Changing orientation of the shell shaft 518 may engage the indexing system 530, thereby rotating the shell 520 and the enclosed gyroscope 524. The drive shaft 515 may then be rotated until the sensitivity axis 534 is perpendicular to the X axis.

In some embodiments, the gyroscope assembly 514 may include an orientation sensor 536. The orientation sensor 536 may detect the orientation of the shell 520 relative to the housing 516. The orientation sensor 536 may be any type of sensor. For example, the orientation sensor 536 may be an optical sensor that detects the orientation of the shell 520 relative to an inside surface of the housing 516. The optical sensor may emit optical light outside of the shell 520 (such as through a port or window). The optical light may reflect off of the interior surface of the housing 516 and/or one or more reflectors inside the interior surface of the housing. The optical sensor may then receive and interpret the reflected light to determine the orientation of the shell 520. In some embodiments, the interior of the housing 516 may include one or more park position reflectors or other indicators. When the orientation sensor 536 detects the park position reflector, the survey tool 512 may determine that the shell 520 is in a park position. In some embodiments, the orientation sensor 536 may be located inside the shell 520. In some embodiments, the orientation sensor 536 may be located outside the shell 520. In some embodiments, the orientation sensor 536 may be located on the housing 516 and may determine the orientation of the shell 520 by detecting the orientation of the outside surface of the shell 520.

In some embodiments, the gyroscope assembly 514 may include any other type of orientation sensor. For example, the drive shaft 515 may include a rotary encoder 537. The rotary encoder 537 may determine the rotational position of the drive shaft 515. In some embodiments, the rotational position of the drive shaft 515 may be used to determine the index position of the shell 520, and thus the orientation of the gyroscope 524 and sensitivity axis 534 of the gyroscope 524. In some embodiments, the orientation sensor 536 and/or the rotary encoder 537 may directly or indirectly determine the orientation of the shell shaft 518 relative to the housing 516.

FIG. 5-2 is a schematic representation of the survey tool 512 of FIG. 5-1 with the gyroscope assembly 514 in an example park position. To move the gyroscope assembly 514 into the park position, the drive shaft 515 has been rotated until the shell 520 has been indexed by the indexing system 530 into a park position. As discussed herein, in a park position, the sensitivity axis 534 is perpendicular or approximately perpendicular to the X axis (e.g., the longitudinal axis of the housing, the rotational axis of the drive shaft 515, the longitudinal axis of the downhole tool). Thus, the gyroscope assembly 514 is rotated by the drive shaft 515 until the sensitivity axis 534 of the gyroscope 524 is perpendicular or approximately perpendicular to the X axis. This may reduce the magnitude of the sensor input at the gyroscope 524 during drilling operations, while the downhole tool rotates. In this manner, bias drift of the gyroscope 524 during drilling operations may be reduced and/or eliminated.

In accordance with embodiments of the present disclosure, the gyroscope assembly 514 may be maintained in a park position during drilling activities or while the housing 516 rotates about the longitudinal axis for other activities. In some embodiments, the gyroscope assembly 514 may be moved to the park position prior to commencing drilling activities. For example, the gyroscope assembly 514 may perform a directional survey when drilling activities are stopped. In such an embodiment, after completing the directional survey, the gyroscope assembly 514 may be moved to the park position while the housing 516 and/or the downhole tool are not rotating and/or otherwise moving. After the gyroscope assembly 514 is in a park position, drilling activities may commence/resume. In some embodiments, drilling activities may wait to commence until the gyroscope assembly is in a park position. For example, after a survey has been completed and the gyroscope assembly 514 has been moved to a park position, an indication may be sent to a controller, such as an MWD, an LWD, a surface location, and so forth. In this manner, an open-loop or closed-loop process may be established to begin a survey when drilling activities are stopped (e.g., when the housing 516 has stopped rotating) and to resume drilling activities (e.g., when the housing 516 can resume rotating) after completion of a survey and parking of the gyroscope assembly 514.

In some embodiments, the gyroscope assembly 514 may move to the park position after the directional survey is completed, and drilling activities may commence at any time (e.g., resuming of drilling activities may not be linked or tied to the completion of the directional survey). In some embodiments, the gyroscope assembly 514 may move to the park position after drilling activities have started. For example, a directional survey may be underway when the housing 516 and/or the downhole tool begin rotating and/or otherwise moving. The gyroscope assembly 514 may sense a change in the input from the gyroscope 524, accelerometers, or other sensors, and which indicate that the housing 516 and/or the downhole tool have started moving. When the gyroscope assembly 514 determines that drilling activities have commenced, the gyroscope assembly 514 may move to the park position while the housing 516 and/or the downhole tool are moving. In this manner, if a directional survey is interrupted by the resumption of drilling activities, the bias drift of the gyroscope 524 may be reduced and/or eliminated by moving the gyroscope assembly 514 to the park position during drilling activities.

In some embodiments, the orientation of the shell shaft 518 may be used to place the gyroscope assembly 514 in the park position. For example, the X' axis of the shell shaft 518 may be used to orient the gyroscope assembly 514 into the park position. For convenience of illustration, in the park position shown in FIG. 5-2, the shell shaft 518 is oriented parallel to an example X-Y plane; however, it should be understood that, in three-dimensional space a park positions may not be aligned with a particular planes as defined for the housing (e.g., as shown in FIG. 2), despite being oriented perpendicular or approximately perpendicular to the longitudinal axis.

In some embodiments, there may be more than one park position for a single gyroscope assembly 514. For example, in three dimensional space, there are multiple positions where the sensitivity axis 534 can be oriented perpendicular to longitudinal axis and maintain that perpendicular orientation while the housing 514 rotates. In some embodiments, one two, three, four, or more predetermined park positions may be determined and used for parking the gyroscope assembly 514 during drilling activities. In a non-limiting example, a a gyroscope assembly 514 capable of a six-axis survey may also have six park positions for the gyroscope assembly 514. During operation, such as after completing a survey, stopping a survey, or otherwise stopping rotation of the gyroscope assembly 514, the gyroscope assembly 514 may move to any of the predetermined park positions. For instance, the gyroscope assembly 514 may determine which park position is the closest, such as by determining which park position could be reached in the shortest amount of time. Thus, each time the gyroscope assembly 514 is moved into a park position, it may be any of the determined park positions for the gyroscope assembly 514. Thus, rather than maintaining the gyroscope assembly 514 at any position where the survey ends, and which may not have the sensitivity axis 534 at a desired orientation relative to the longitudinal axis of the downhole tool, the gyroscope assembly 514 can be actively moved to a park position specifically determined as being desirable for reducing or minimizing high magnitude readings, or bias drift.

In some embodiments, the park position may be perpendicular to the X axis. In some embodiments, the park position may be within a park position tolerance of perpendicular to the X axis such that the park position is within plus or minus the park position tolerance of perpendicular to the X axis. In some embodiments, the park position tolerance is in a range having an upper value, a lower value, or upper and lower values including any of 5°, 4°, 3°, 2.5°, 2°, 1.5°, 10, 0.9°, 0.8°, 0.7°, 0.6°, 0.5°, 0.4°, 0.3°, 0.2°, 0.1°, or any value therebetween. For example, the park position tolerance may be greater than 0.1°. In another example, the park position tolerance may be less than 5°. In yet other examples, the park position tolerance may be any value in a range between 0.10 and 5°. In some embodiments, it may be critical that the park position tolerance is less than 10 or less than 1.5° to reduce and/or eliminate the bias drift of the MEMS gyroscope 524. In some embodiments, approximately perpendicular to the X axis may be perpendicular plus or minus the park position tolerance. In some embodiments, the park position tolerance may be less than the angle where the angular velocity input to the gyroscope is less than a critical amplitude even under a maximum rotation speed of the downhole tool. In some embodiments, the park position tolerance angle (a) may be described as:

$$\alpha = \pm \operatorname{asin}\left(\frac{\omega_{gc}}{\omega_{dt}}\right)$$

or $$\alpha = \pm \sin^{-1}\left(\frac{\omega_{gc}}{\omega_{dt}}\right)$$

where $\omega_{gc}$ is the critical gyroscope rotational speed in revolutions per minute (RPM), and $\omega_{dt}$ is the downhole tool RPM.

As discussed herein, the park position may be based on the calculated or estimated orientation of the sensitivity axis 534. The sensitivity axis 534 may be the axis that extends through the gyroscope 524, and along which measurements are made. In some embodiments, the sensitivity axis 534 may be approximated as perpendicular to the X' axis of the shell shaft 518.

According to some embodiments, the park position tolerance may be at least partially predetermined so as to compensate for determining misalignment of the sensitivity axis 534 of the gyroscope when determined through a calibration process as discussed herein. In some embodiments, the actual orientation of the sensitivity axis 534 may be determined based on the actual placement and construction of the gyroscope 524, and may differ from an idealized position. In some embodiments, the gyroscope 524 may be misaligned relative to the X' axis of the shell shaft 518. For instance, the sensitivity axis 534 may be misaligned from a line normal to the shell shaft 518.

Misalignment may be determined using any suitable calibration procedure. An example tri-axial MEMS gyroscope error calibration method is presented in YANG, H. et al, "A Novel Tri-Axial MEMS Gyroscope Calibration Model over a Full Temperature Range", Sensors (Basel), 2018, 18(9), and is incorporated herein by this reference in its entirety. Other calibration models are also known in the art. The calibration procedure may be used for compensation in actual survey measurements to compensate for alignment and other errors and obtain accurate readings from the gyroscope in operation. Calibration may further be used to determine the one or more park positions so they are also adjusted to compensate for the misalignment of the gyroscope 524. Thus, the calibration may be specific to a particular gyroscope, and the one or more park positions may correspondingly be specific to the particular gyroscope.

One source of misalignment may be manufacturing and assembly misalignment. Manufacturing and assembly misalignment may be the result of standard variance and tolerances in manufacturing. Examples of manufacturing and assembly misalignment include misalignment of the gyroscope 524 during manufacturing of the gyroscope 524 itself (e.g., alignment of internal MEMS electronics relative to sensor housing). Another example of manufacturing or assembly misalignment may be misalignment resulting from variations in size, shape, etc. of the shell shaft 518, sensor platforms, fasteners, other assembly components used during assembly of the gyroscope assembly 514 to connect the gyroscope 524 to the other components of the gyroscope assembly 514 (e.g., the shell shaft 518, the sensor platforms, the shell 520, etc.). Further misalignment may also occur when connecting the gyroscope assembly 514 to a BHA. Misalignment of the gyroscope 524, including the sensitivity axis 534, may thus occur as a result of manufacturing misalignment, assembly misalignment, installation misalignment, other misalignment, and combinations thereof.

The orientation (e.g., alignment) of the sensitivity axis 534 relative to the shell shaft 518 may be determined based on the misalignment of the gyroscope 524. For example, during assembly of the gyroscope assembly 514, the alignment of the gyroscope 524 relative to the shell 520 and/or the shell shaft 518 may be measured by measuring the distances, thicknesses, and orientations of the various components of the gyroscope assembly 514. In some examples, after the gyroscope assembly 514 is assembled, the gyroscope assembly 514 may be tested in a laboratory or shop by collecting gyroscope measurements in a controlled environment. The orientation of the sensitivity axis 534 may then be determined using the collected sample measurements compared to the control measurements.

In some embodiments, misalignment may be determined and compensated for when the gyroscope assembly 514 is assembled. For example, when the gyroscope assembly 514 is assembled, alignment sensors may be used to determine the misalignment of the gyroscope 524 in the laboratory or the shop. The collected measurements from the alignment sensors may be compared to known orientations to determine the misalignment of the gyroscope 524.

Misalignment may be determined using a calibration procedure. A calibration procedure may be performed in the shop or downhole. During a calibration procedure, the housing 516 may be rotated at a low rotational speed. While the housing 516 is rotated, the gyroscope assembly 514 may be rotated by rotating the drive shaft 515 while collecting measurements from the gyroscope 524. The signal from the gyroscope 524 may be minimized, or within a tolerance range, when the gyroscope 524 is perpendicular to the rotational axis of the downhole tool. The rotational position of the gyroscope assembly 514 when the signal from the gyroscope 524 is minimized may be a park position. In some embodiments, the signal from the gyroscope 524 may vanish when the gyroscope 524 is perpendicular to the rotational axis. In some embodiments, calibrating the gyroscope assembly 514 may help to improve the accuracy and precision of the gyroscope 524 reading collected during a survey.

In some embodiments, calibrating the gyroscope assembly 514 to compensate for misalignment may help to fine-tune the park position. For example, the various park positions may be mathematically determined based on the designed orientation of the components of the gyroscope assembly 514. After calibrating the gyroscope assembly 514, the park position may be adjusted based on the determined misalignments. In this manner, the park position may be fine-tuned to reduce sensor overload during drilling activities.

As will be understood in view of the disclosure herein, the determination of one or more park positions optionally includes a calibration process to identify a true orientation of the sensitivity axis 534 or, stated another way, a misalignment or deviation of the orientation of the sensitivity axis 534 from a predicted, expected, or estimated orientation. The calibration may be part of the sensor calibration used for compensating sensor measurements, and may include the additional act of compensating for misalignment to determine one or more park positions. In other embodiments, a separate calibration process may be used specifically for determining the one or more park positions.

In some embodiments, the sensitivity axis 534 may be oriented perpendicular to the X' axis in the park position. In some embodiments, the sensitivity axis 534 may be oriented within a manufacturing or operating tolerance from perpendicular to X' axis. In some embodiments, the manufacturing or operating tolerance may be in a range having an upper value, a lower value, or upper and lower values including any of 5°, 4°, 3°, 2.5°, 2°, 1.5°, 10, 0.9°, 0.8°, 0.7°, 0.6°, 0.5°, 0.4°, 0.3°, 0.2°, 0.1°, 0.01°, or any value therebetween. For example, the manufacturing or operating tolerance may be greater than 0.01°. In another example, the manufacturing or operating tolerance may be less than 5°. In yet other examples, the manufacturing or operating tolerance may be any value in a range between 0.01° and 5°. In some embodiments, it may be critical that the manufacturing or operating tolerance is less than 2.5° to help reduce and/or eliminate bias drift of the gyroscope 524.

The manufacturing or operating tolerance is optionally used when tracking the position of the shell 520 to determine when the gyroscope assembly 514 is in the park position. For example, the orientation sensor 536 may detect the orientation of the shell 520 relative to the housing 516 to determine when the gyroscope assembly 514 is in the park position. In some examples, a rotary encoder 537 on the drive shaft 515 may measure the rotational position of the drive shaft 515. The rotational position of the drive shaft 515 may be correlated with the orientation of the shell 520 and/or the enclosed gyroscope 524. The survey tool 512 may adjust the position at which the shell 520 is sensed by the orientation sensor 536 to determine that the gyroscope assembly 514 is in the park position. In some cases, the manufacturing or operating tolerance may be considered when determining when the gyroscope assembly 514 is in the park position. For instance, the survey tool 512 may adjust the park position of the gyroscope assembly 514 based on the manufacturing or operating tolerance. In some embodiments, a manufacturing tolerance is determined prior to inserting the gyroscope assembly 514 in the housing 516, and/or the park position adjusted prior to performing a directional survey.

In some embodiments, a source of misalignment may be an orientational misalignment of the gyroscope assembly 514 within the housing 516. The orientational misalignment of the gyroscope assembly 514 within the housing 516 may occur at assembly. In other words, when the gyroscope assembly 514 is inserted in the housing 516 or when the gyroscope 524 is attached to the shell shaft 513 or a sensor platform, the gyroscope assembly 514 may not perfectly align with the X axis and/or the sensitivity axis 534 of the gyroscope 534 may not be perfectly perpendicular to the shell shaft 518. For example, the drive shaft 515 may not be aligned parallel to the X axis. In some examples, the shell shaft 518 may be misaligned with the X axis (e.g., oriented at a different angle than the designed angle). In some embodiments, the orientation misalignment may be a result of the housing 516 being assembled such that the X axis is misaligned relative to the longitudinal axis of the downhole tool.

In some embodiments, the orientation misalignment may occur downhole. For example, during drilling activities, as the housing 516 and/or the downhole tool rotates, vibrates, bumps, jostles, and otherwise moves, the gyroscope assembly 514 may get bumped out of place. Put another way, movement of the housing 516 and/or the downhole tool may cause the gyroscope 524 to move within the shell 520, the gyroscope assembly 514 to move relative to the housing 516, and/or the housing 516 to move relative to the downhole tool. This may change the alignment of the gyroscope assembly 514. In some embodiments, this may result in a change to the orientation of the sensitivity axis 534 relative to the X axis.

In some embodiments, the gyroscope assembly 514 may be calibrated downhole to determine any changes in the orientation misalignment. After downhole calibration, the survey tool 512 adjust the park position(s) based on the results of the calibration. Adjusting the park position to compensate for orientation misalignment may help to reduce and/or eliminate bias drift of the gyroscope 524.

In some embodiments, the gyroscope assembly 514 may be calibrated by rotating the gyroscope assembly 514 and comparing the measurements to a previous measurement to determine if the alignment has changed. Calibration may occur at any time. For example, the survey tool 512 may be calibrated prior to installing the survey tool 512 with the downhole tool, after it has been installed in a downhole tool but before the downhole tool has been connected to the drill string, or after coupling the downhole tool to the drill string but before downhole use. In some examples, the survey tool 512 may be calibrated while downhole or even while performing a direction survey. In some examples, the survey tool 512 may be calibrated during drilling activities (e.g., while the housing 516 and/or the downhole tool is rotating). To perform a calibration during drilling activities, the survey tool 512 may periodically take the gyroscope assembly 514 out of the park position, rotate the gyroscope assembly 514 to determine the orientation misalignment, and then return the gyroscope assembly 514 back to the park position. This may help to compensate for any changes to the orientation misalignment that occurs during drilling activities. By maintaining the calibration of the gyroscope assembly 514, the bias drift of the gyroscope assembly may be reduced, thereby improving survey accuracy.

In some embodiments, the orientation misalignment may be in a range having an upper value, a lower value, or upper and lower values including any of 5°, 4°, 3°, 2.5°, 2°, 1.5°, 1°, 0.9°, 0.8°, 0.7°, 0.6°, 0.5°, 0.4°, 0.3°, 0.2°, 0.1°, 0.01°, or any value therebetween. For example, the orientation misalignment may be greater than 0.01°. In another example, the orientation misalignment may be less than 5°. In yet other examples, the orientation misalignment may be any value in a range between 0.010 and 5°. In some embodiments, it may be critical that the orientation misalignment is less than 2.5° to help reduce and/or eliminate bias drift of the MEMS gyroscope 524.

As discussed herein, the one or more park positions may be determined mathematically using the designed gyroscope assembly 514 orientations, or experimentally by rotating the gyroscope assembly 514 with the gyroscope 524 in various positions in order to identify low signal positions. In some embodiments, park position(s) may also be modified to compensate for misalignment. For example, after determining the orientation misalignment, the survey tool 512 may adjust the park position to compensate for the misalignment of the sensitivity axis 534. This may help to orient the sensitivity axis 534 perpendicular to the X axis in the various park positions. In some embodiments, the survey tool 512 may adjust the park position as an initial calibration prior to the survey tool 512 being connected to the drill string or prior to being used downhole. In some embodiments, the survey tool 512 may adjust the park position when the survey tool 512 is downhole to compensate for misalignment that may occur during downhole drilling activities. In some embodiments, the survey tool 512 may adjust the park position during drilling activities. This may help to reduce or prevent sensor overload or other detrimental actions during drilling activities, thereby reducing or eliminating bias drift of the gyroscope 524.

While the embodiments of FIGS. 5-1 and FIG. 5-2 have described the park position as the orientation of the sensitivity axis 534 with respect to the X axis, it should be understood that the park position may be the orientation of the sensitivity axis 534 with respect to the downhole tool longitudinal axis. In some embodiments, the X axis may be the same as the downhole tool longitudinal axis. Thus, when the sensitive axis 534 is perpendicular or approximately perpendicular to the X axis, the sensitivity axis 534 may be perpendicular or approximately perpendicular to the downhole tool longitudinal axis. In some embodiments, the X axis may be different from the downhole tool longitudinal axis. For example, the survey tool 512 may be mounted within the downhole tool such that the X axis is offset from the downhole tool longitudinal axis or such that the X axis is not parallel to the downhole tool longitudinal axis. In some embodiments, in the park position, the sensitivity axis 534 is perpendicular or approximately perpendicular to the downhole tool longitudinal axis and the X axis. In some embodiments, in the park position, the sensitivity axis 534 is perpendicular or approximately perpendicular one, but not both, of the downhole tool longitudinal axis or the X axis.

In some embodiments, when the gyroscope assembly 514 is moved into the park position, the motor that rotates the drive shaft 515 may hold the drive shaft in place. In some embodiments, the motor may include a brake, pin, locking clutch, or other mechanical lock to lock the drive shaft in the park position. A mechanical lock may help to maintain the gyroscope assembly 514 in the park position when power is disconnected to the motor and/or the gyroscope assembly 514.

In some embodiments, the gyroscope assembly 514 may be connected to the power during drilling activities. This may allow the gyroscope assembly 514 to maintain the park position during drilling activities. In some embodiments, maintaining power to the gyroscope assembly 514 may allow changing of position during drilling activities. In this manner, if the gyroscope assembly 514 were to slip out of the park position, the orientation sensor 536 or rotary encoder 537 may sense the movement and the survey tool 512 may instruct the motor to rotate the drive shaft 515 until the gyroscope assembly 514 is returned to the park position.

In some embodiments, keeping the power connected to the gyroscope assembly 514 during drilling activities may decrease the set up time for the gyroscope 524 to begin performing a directional survey. For instance, to further avoid overloading the gyroscope 524, power can be disconnected from the gyroscope 524 during drilling activities. When a survey is then desired, the gyroscope 524 may take some time to start up before performing surveying activities. Start up of the directional sensor takes a startup period, which may be over five minutes, over ten minutes, or over fifteen minutes. In some embodiments, depending on the length of time drilling activities are paused, a long startup period may reduce the amount of time available to take a directional survey, resulting in a partially complete survey or incomplete directional survey.

In some embodiments, however, parking the survey tool 512 may provide sufficient protection against overloading the gyroscope 524 to allow a power connection to be maintained for the gyroscope 524 during drilling activities. Consequently, the startup time to begin taking a directional survey may be reduced. In some embodiments, the startup time may be in a range having an upper value, a lower value, or upper and lower values including any of 0.05 s, 0.1 s, 0.5 s, 1 s, 5 s, 10 s, 30 s, 1 min, 1.5 min, 2.0 min, 2.5 min, or any value therebetween. For example, the startup time may be greater than 0.05 s. In another example, the startup time may be less than 2.5 min. In yet other examples, the startup time may be any value in a range between 0.05 s and 2.5 min. In some embodiments, it may be critical that the startup time is less than 10 s to begin a survey without delay and reduce the chance of a partial or incomplete directional survey.

Figures 1, 6:
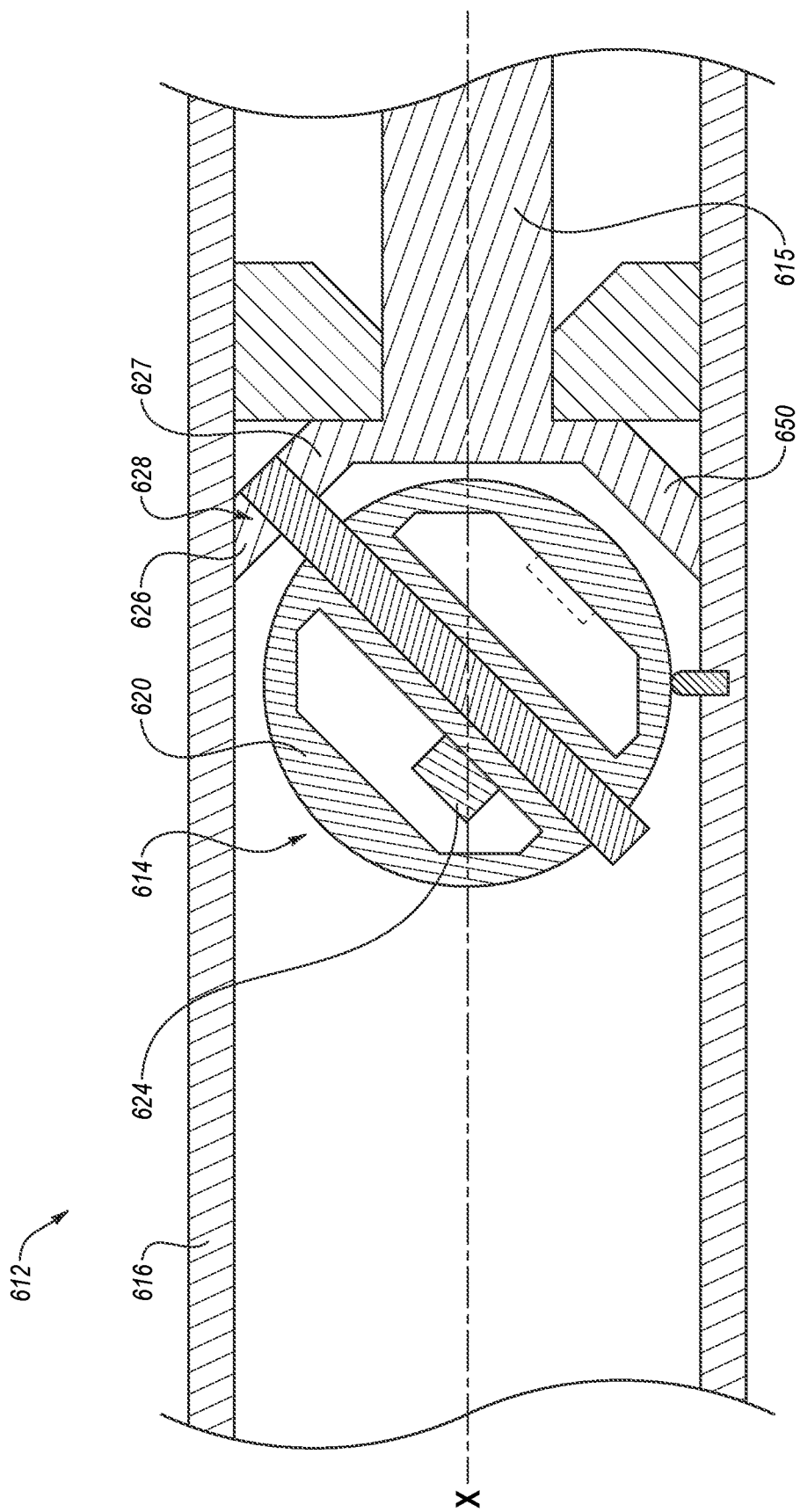
Figures 3, 6:
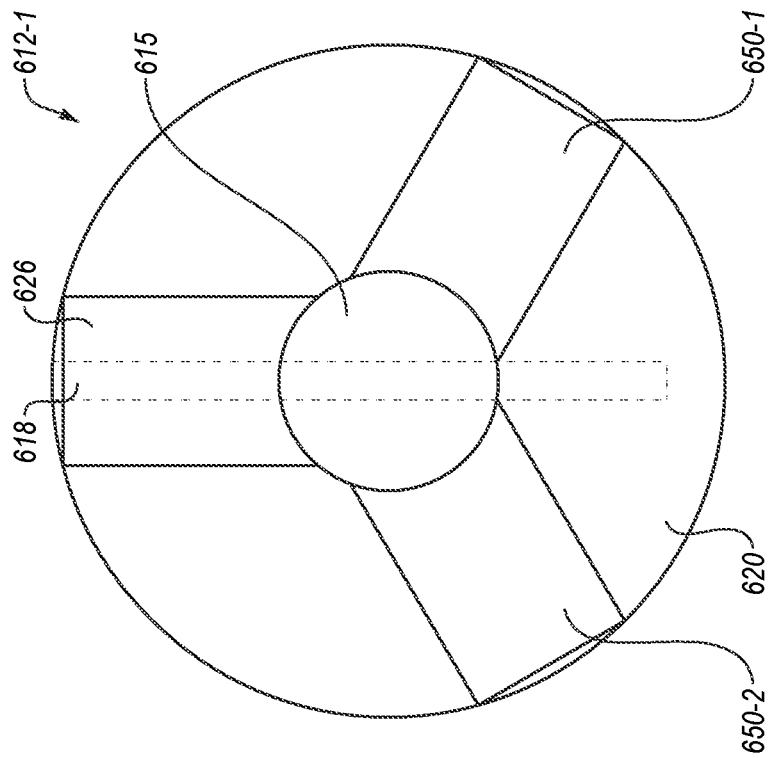
Figures 2, 6:
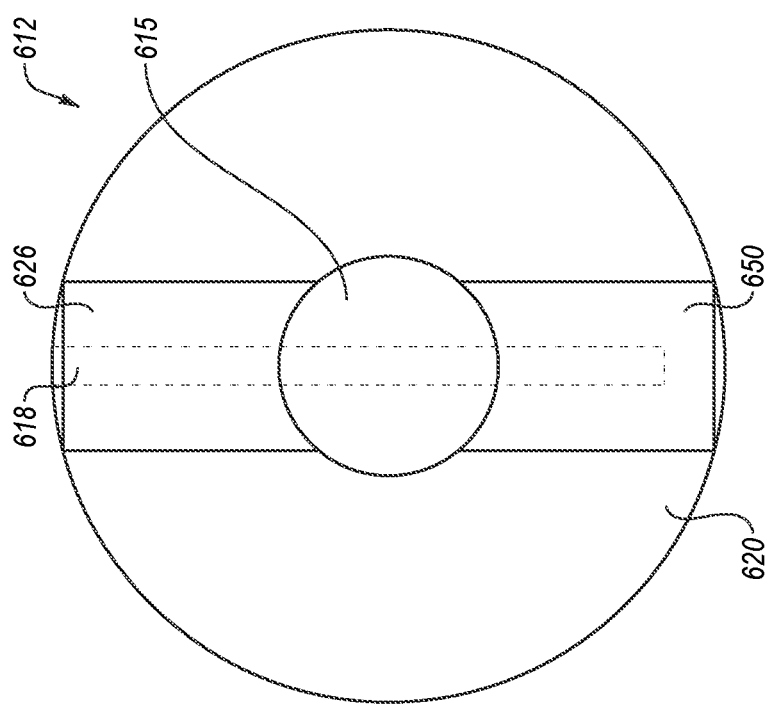

FIG. 6-1 is a representation of a survey tool 612 including a counter arm 650, according to at least one embodiment of the present disclosure. A gyroscope assembly 614 may be inserted into a housing 616. The gyroscope assembly 614 may be supported by an arm member 626 of a drive shaft 615 inside the housing 616. The arm member 626 may be connected to the drive shaft 615 at a proximal end 627 and extend radially to a distal end 628. The gyroscope assembly 614 may be connected to the arm member 626 at the distal end 628. The drive shaft 615 may rotate about the X axis (e.g., the longitudinal axis of the housing 616), causing the gyroscope assembly 614 (including arm member 626) to also rotate about the X axis.

In some embodiments, the gyroscope assembly 614 may be unbalanced about the drive shaft 615, and potentially unbalanced about the X axis. The gyroscope assembly 614 may be unbalanced because of the mass of the arm member 626 that is cantilevered or otherwise extends away from the drive shaft 615.

As discussed herein, in some embodiments, drilling activities, including rotation, vibration, bumps, jostles, and other movements may cause the gyroscope assembly 614 to become misaligned from the housing 616. The cantilevered mass of the arm member 626 may, for instance, have a rotational inertia, and vibration or other movement of the survey tool 612 may cause the gyroscope assembly 614 to rotate and become misaligned from a park position or other desired position. A misaligned gyroscope assembly 614 may result in undesired sensor readings, or larger than desired readings, that potentially cause bias drift of the gyroscope 624.

In some embodiments, a counter arm 650 may be connected to the drive shaft 615 opposite the arm member 626. The counter arm 650 may balance the gyroscope assembly 614 about the drive shaft 615 and/or the X axis, and change the rotational inertia to make it less likely that vibration will cause the gyroscope assembly 614 to rotate in response to dynamic downhole conditions. In some embodiments, the counter arm 650 may counterbalance (e.g., balance) the arm member 626 about the drive shaft 615 during rotation of the drive shaft 615. In some embodiments, the counter arm 650 may counterbalance the arm member 626 about the drive shaft 625 during rotation of the housing 616 and/or the downhole tool about the X axis. When the gyroscope assembly 614 is moved during drilling activities, the counter arm 650 may help to reduce misalignment caused by the unbalanced gyroscope assembly 614. Reducing the misalignment may help to reduce or avoid bias drift of the gyroscope 624.

In some embodiments, the counter arm 650 may be integrally formed with the arm member 626. For example, the arm member 626 may be machined, molded, or cast as a uniform whole with the counter arm 650, and potentially with the drive shaft 615. In some embodiments, the counter arm 650 may be separately formed from the counter arm 650 and attached via weld, mechanical connection, braze, or other connection mechanism.

The counter arm 650 has a counter arm mass and the arm member 626 has an arm member mass. In some embodiments, the counter arm mass may be the same as the arm member mass. In some embodiments, the counter arm mass may be different from the arm member mass. For example, the counter arm mass may be less than the arm member mass. In some examples, the counter arm mass may be greater than the arm member mass. In some embodiments, a different counter arm mass may account for unbalanced elements or sensors housed in the shell 620.

The counter arm 650 has a counter arm size and a counter arm shape. The arm member 626 has an arm member size and an arm member shape. In some embodiments, one or more of the counter arm size or counter arm shape may be the same as the arm member size or shape. In some embodiments, one or more of the counter arm size or shape may be different from the arm member size or shape. Changes in the size and/or shape of the counter arm 650 compared to the arm member 626 may help to account for differences in the mass and/or rotational inertia of the arm member 626 and other members of the gyroscope assembly 614.

In some embodiments, the gyroscope assembly 614 may include multiple counter arms 650. For example, the gyroscope assembly 614 may include any number of counter arms 650 radially spaced around the drive shaft 615. In some embodiments, the gyroscope assembly 614 may include 2, 3, 4, 5, 6, or more counter arms 650. As adding additional counter arms 650 could increase the mass of the gyroscope assembly 614, in some embodiments, the number and/or mass of the counter arms 650 may be balanced with the power of the motor driving the drive shaft 615.

FIG. 6-2 is a representation of an end view of the survey tool 612 of FIG. 6-1. The survey tool 612 includes a shell 620 driven by a drive shaft 615. The drive shaft 615 includes an arm member 626 that extends radially out from the drive shaft 615 and which is connected to a shell shaft 618 about which the shell 620 rotates. The drive shaft 615 further includes a counter arm 650. As may be seen, the counter arm 650 is shown as aligned with the shell shaft 618. This may help to mass-balance the drive shaft 615. Furthermore, in the embodiment shown, the counter arm 650 is shown as being oriented 180° (e.g., opposite, diametrically opposed) from the arm member 626. In this orientation, the counter arm 650 may help to mass-balance the drive shaft 615 by providing a counterweight to the arm member 626.

FIG. 6-3 is a representation of another survey tool 612-1 having two counter arms 650-1, 650-2 (collectively 650), according to at least one embodiment of the present disclosure. In the embodiment shown, the shell 620 is rotated by a drive shaft 615 connected to an arm member 626 coupled to the shell shaft 618 and the shell 620. As a result, the shell 620 may rotate as the drive shaft 615 rotates, while also rotating about the shell shaft 618.

In this particular embodiment, the survey tool 612-1 includes two counter arms 650-1, 650-2. The counter arms 650-1, 650-2 may help to mass balance the drive shaft 615. In the embodiment shown, the counter arms 650-1, 650-2 are not aligned with the shell shaft 618. For example, the counter arms 650-1, 650-2 shown are each angularly offset by 120° from the arm member 626; however, it should be understood that the counter arms 650-1, 650-2 may be oriented at any orientation relative to the arm member 626 and/or the shell shaft 618. For instance, the counter arms 650-1, 650-2 may each have a different mass or a different mass than the arm member 626, and it may be desirable to move the counter arms 650-1, 650-2 to other positions to obtain a desired rotational inertia.

Thus, in some embodiments, the first counter arm 650-1 may be the same size and/or mass as the second counter arm 650-2. In some embodiments, the first counter arm 650-1 may be a different size and/or mass than the second counter arm 650-2. In some embodiments, the angular spacing between the arm member 626, the first counter arm 650-1, and the second counter arm 650-2, may be based on the relative shapes and/or sizes of the arm member 626, the first counter arm 650-1, and the second counter arm 650-2. The angular spacing may be determined to mass balance the drive shaft 615. This may help to reduce the introduction of misalignment to a gyroscope housed within the survey tool 612. In some embodiments, rather than using a counter arm, a counterweight or other mass may be used to balance a drive shaft.

Figure 7:
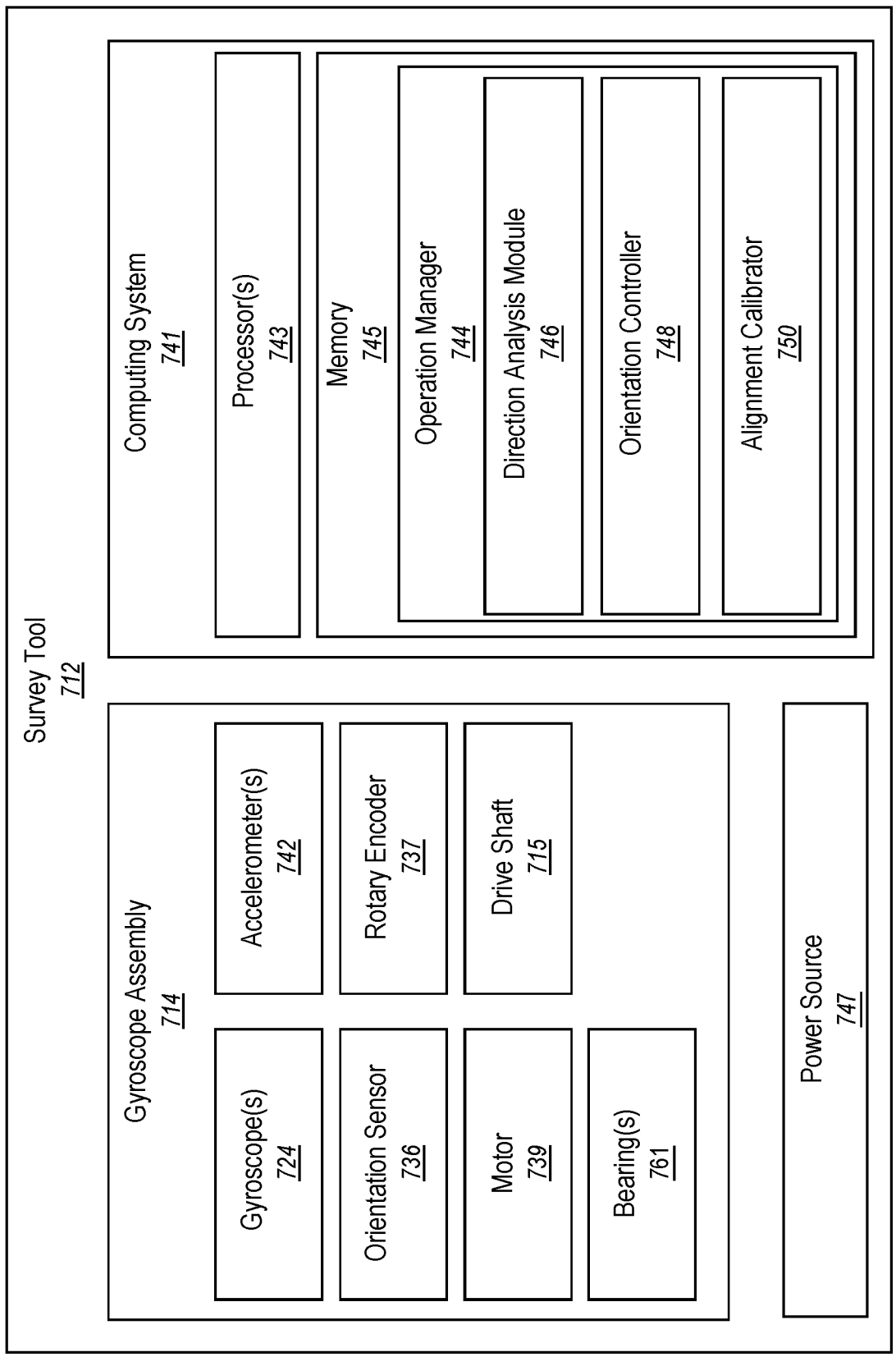
FIG. 7 is a schematic representation of another survey tool, according to at least one embodiment of the present disclosure.

FIG. 7 is a representation of a survey tool 712, according to at least one embodiment of the present disclosure. The survey tool 712 may include a gyroscope assembly 714 having one or more gyroscopes 724, one or more accelerometers 742, and optionally includes one or both of an orientation sensor 736 or a rotary encoder 737. The rotational orientation of the gyroscope assembly 714 may be determined using the orientation sensor 736 and/or the rotary encoder, as described herein. The gyroscope assembly 714 may determine the orientation of the downhole tool using measurements from the gyroscope(s) 724 and/or the accelerometer(s) 742 collected while rotating the gyroscope assembly 714 with the drive shaft 715 connected to the motor 739. The motor may also include or be coupled to a power source 747 of a suitable type (e.g., a battery, turbine power generator, etc.), and which can rotate the motor 739 to move the gyroscope assembly 714 while performing a survey, to move the gyroscope(s) 724 to a park position, and the like. In some embodiments, the gyroscope 724 may be a MEMS gyroscope. In some embodiments, the gyroscope may be a rotary gyroscope. In some embodiments, the gyroscope 724 may be any type of mechanical gyroscope. In some embodiments, the gyroscope 724 may be a gas-bearing gyroscope, having a rotor suspended by a pressurized gas. In some embodiments, the gyroscope 724 may be an optical gyroscope. In some embodiments, the gyroscope 724 may be any other type of gyroscope.

In some embodiments, the gyroscope assembly 714 may include three accelerometers 742, oriented in the X', Y', and Z' directions. In some embodiments, the gyroscope assembly 714 may include any number of accelerometers 742 oriented in any direction. In some embodiments, the gyroscope assembly 714 may include an orientation sensor 736 that may sense the orientation of the gyroscope assembly 714 and/or a rotary encoder 737 that senses a rotary position of the drive shaft 715 (including an arm member or counter arm). The gyroscope assembly may also include any number of other components, including bearings 761 to support rotation of the drive shaft 715, a shell shaft, or other rotary components.

In some embodiments, the gyroscope assembly 714 may collect survey data, including positional information from the gyroscope 724, acceleration data from the accelerometers 742, and orientation information from the orientation sensor 736 and/or the rotary encoder 737. The gyroscope assembly 714 and/or the power source 747 may be in communication with a computing system 741. For example, the gyroscope assembly 714 may send the survey data to the computing system 741, and a processor 743 coupled to the power source 747 may interpret or process the survey data.

The computing system 741 may define an electronics assembly used to control operation of the gyroscope assembly 714. The computing system 741 may include one or more processors 743 and memory 745. The memory 745 may include instructions which, when accessed by the processor 743, cause the processor 743 to perform various actions. In some embodiments, the computing system 741 may be a downhole computing system that is physically located on the gyroscope assembly 714. In some embodiments, the downhole computing system 741 may be located on a BHA. In some embodiments, the downhole computing system may receive input and/or instructions from the BHA. In some embodiments, the computing system is wholly or partially at the surface. For instance, one or more processors and memory may be downhole, and other processors and memory may be at the surface.

In some embodiments, memory 745 may include instructions in the form of an operation manager 744. The operation manager 744 may include a direction analysis module 746. The direction analysis module 746 may utilize the survey data from the gyroscope assembly 714 to determine the direction (e.g., azimuth and inclination) of the downhole tool. The operation manager 744 may further include an orientation controller 748. The orientation controller 748 may utilize the orientation information from the orientation sensor 736 or rotary encoder 737 to determine the orientation of the gyroscope assembly 714 relative to a housing. In some embodiments, the orientation controller 748 may cause the gyroscope assembly 714 to move during a survey to obtain survey data at desired positions and/or to move into a park position. For example, the orientation controller 748 may be in communication with the motor 739 that may rotate the drive shaft 715. The orientation controller 748 may send instructions to the motor 739 to rotate the drive shaft 715 in a desired direction until the gyroscope assembly 714 is in the park position.

The operation manager 744 may further include an alignment calibrator 751. The alignment calibrator 751 may receive the survey data, including the position information from the gyroscope(s) 724. Using the position information, the alignment calibrator 751 may determine an amount of misalignment caused by motion of the downhole tool. In some embodiments, the alignment calibrator 751 may determine that misalignment has occurred or changed. The alignment calibrator 751 may provide the orientation misalignment to the orientation controller 748, which may, in response, control the motor 739 to change the position of the gyroscope assembly 714. For instance, the orientation controller 748 may move the gyroscope assembly 714 back into a park position when it is determined that the position of the gyroscope assembly 714 has changed, or may change the park position itself based on a determine that the gyroscope (s) 724 have a changed misalignment. For example, the orientation controller 748 may maintain in memory a total misalignment, which is the sum of the manufacturing and assembly misalignment and the orientation misalignment. When the orientation controller 748 receives the changed misalignment information from the alignment calibrator 751, the orientation controller 748 may update the total misalignment based on the manufacturing and assembly misalignment and the changed orientation misalignment.

Figure 8:
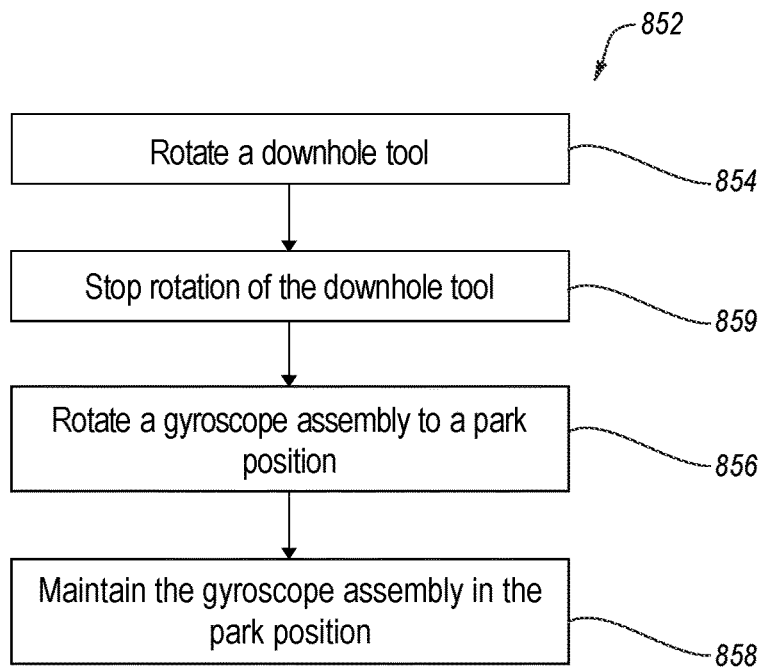
FIG. 8 is a flowchart of a method for stabilizing a gyroscope assembly while drilling, according to at least one embodiment of the present disclosure.

FIG. 8 is a representation of a method 852 for stabilizing a gyroscope while drilling, according to at least one embodiment of the present disclosure. The method 852 may include rotating a downhole tool at 854. The downhole tool may rotate about a downhole tool longitudinal axis. A gyroscope assembly may be located in the downhole tool, and optionally rotates with the downhole tool. In the method 852, the gyroscope assembly may be rotated to a park position at 856. The gyroscope assembly may also be maintained in the park position at 858.

The rotation of the gyroscope assembly to the park position at 856 may be independent of the rotation of the downhole tool at 854. For instance, the gyroscope assembly may be rotatable within a housing that rotates with the downhole tool. In the park position, a gyroscope is optionally oriented to have a sensitivity axis at a position that has been predetermined to minimize or even eliminate one or more of bias drift or sensor overload. In some embodiments, the park position orients one or more gyroscopes within 5° of perpendicular to the downhole tool longitudinal axis. In some embodiments, the gyroscope may be oriented within 2.5° of perpendicular to the longitudinal axis. In some embodiments, the gyroscope may be oriented within 1° of perpendicular to the longitudinal axis. The orientation of a gyroscope may refer to an estimated or calibrated orientation of a sensitivity axis of the gyroscope.

In some embodiments, rotating the gyroscope assembly to the park position at 856 may include rotating the gyroscope assembly to the park position before rotating the downhole tool at 854. In some embodiments, maintaining the gyroscope assembly in the park position at 858 may include actively restricting physical rotation of the gyroscope assembly relative to the downhole tool or monitoring position of the gyroscope assembly and adjusting the rotational position of the gyroscope assembly. Maintaining the gyroscope assembly in the park position may occur while rotating the downhole tool at 854. For example, while the downhole tool is rotating at 854, the gyroscope assembly may rotate to determine its orientation misalignment. The gyroscope assembly may move the gyroscope back to the park position based on updated orientation misalignment, or may adjust the park position based on the updated orientation misalignment.

In some embodiments, the method 852 may include stopping rotating the downhole tool at 859. While the housing is stopped, the gyroscope assembly may obtain or collect a survey measurement by rotating the gyroscope assembly in the downhole tool. After obtaining the survey measurement, the gyroscope may be returned to the park position at 856 and the downhole tool may resume rotating at 854. In some embodiments, the directional survey may occur within 5 seconds or within 10 seconds after the downhole tool stops rotating at 859.

Figure 9:
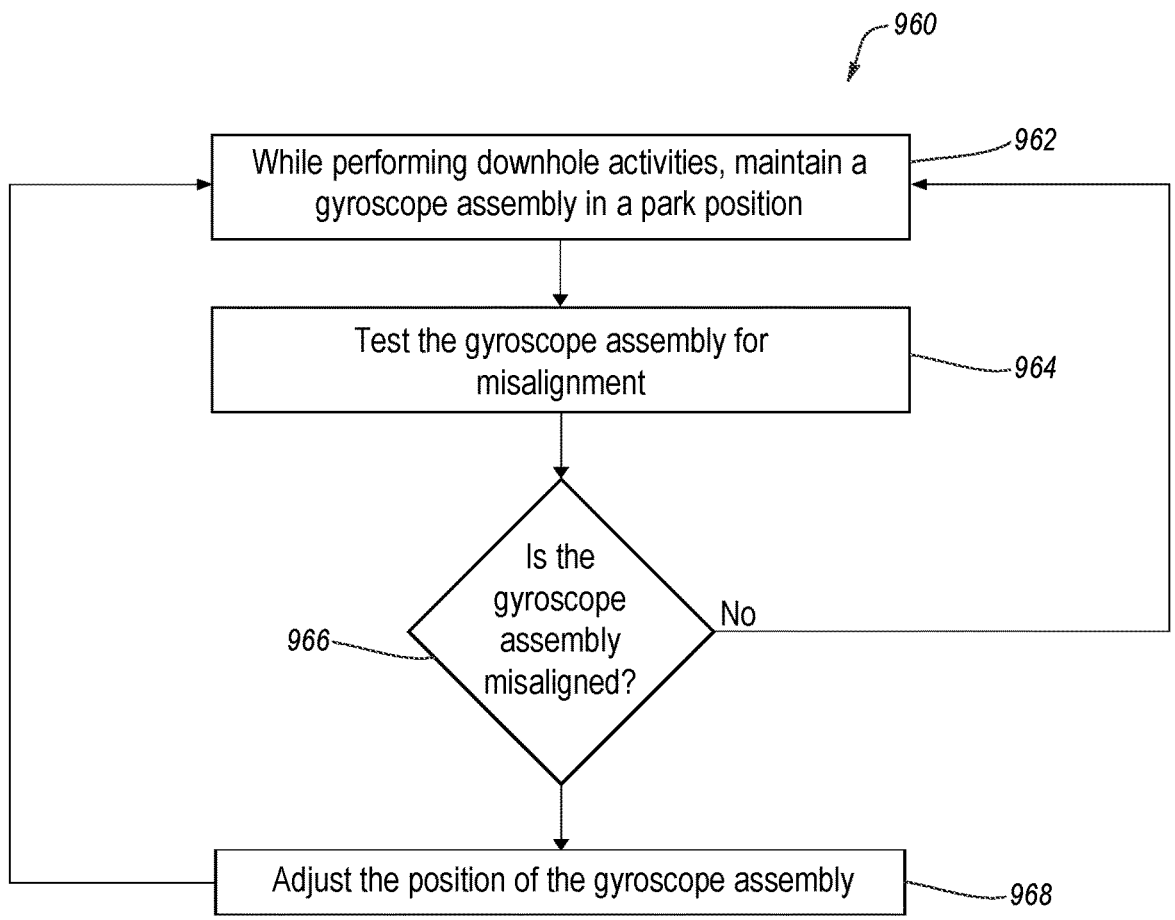
FIG. 9 is a flowchart of another method for stabilizing a MEMS gyroscope while drilling, according to at least one embodiment of the present disclosure.

FIG. 9 is a representation of a method 960 for stabilizing a gyroscope assembly while drilling, according to at least one embodiment of the present disclosure. While performing drilling or other downhole activities, the gyroscope assembly may be maintained in a park position at 962. In some embodiments, the gyroscope assembly may be tested for misalignment at 964. Testing the gyroscope assembly for misalignment may include rotating the gyroscope assembly and collecting directional survey information. Testing the gyroscope assembly for misalignment may also include using one or more sensors to determine that the gyroscope assembly has moved from a park position, or determining that the gyroscope has become misaligned and the park position should be modified.

The collected direction or sensor information may be compared to previous direction or sensor information. Using this comparison, an alignment calibrator may determine whether the gyroscope assembly is misaligned at 966. If the gyroscope assembly is not misaligned, then the gyroscope assembly may be maintained at the current, park position. The gyroscope assembly may be periodically tested for orientation misalignment, and the misalignment determiner may check if the gyroscope assembly is misaligned after each orientation misalignment test is performed. This loop may be repeated until the gyroscope assembly is determined to be misaligned.

If the MEMS gyroscope assembly is determined to be misaligned, then the position of the gyroscope assembly may be adjusted to account for the updated orientation or operational misalignment at 968. Adjusting for orientation misalignment at 968 may also include adjusting the park position and moving the gyroscope assembly to the updated park position. The method 960 may then return to maintaining the gyroscope assembly in the park position at 962. This cycle may loop until the downhole tool is removed from the wellbore.

Figure 10:
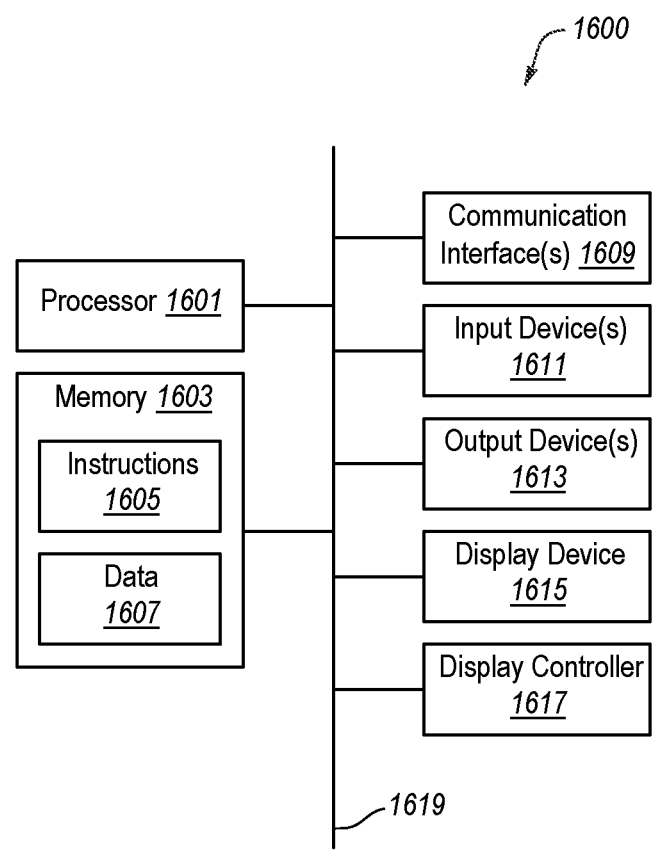
FIG. 10 is a schematic view of a computing system, according to at least one embodiment of the present disclosure.

FIG. 10 illustrates certain components that may be included within a computer system 1600. One or more computer systems 1600 may be used to implement the various devices, components, and systems described herein, such as the survey tool 712 described with respect to FIG. 7.

The computer system 1600 includes a processor 1601. The processor 1601 may be a general-purpose single or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 1601 may be referred to as a central processing unit (CPU). Although just a single processor 1601 is shown in the computer system 1600 of FIG. 10, in an alternative configuration, a combination of processors (e.g., an ARM and DSP) could be used.

The computer system 1600 also includes memory 1603 in electronic communication with the processor 1601. The memory 1603 may be computer readable storage media embodied as any electronic component capable of storing electronic information. For example, the memory 1603 may include random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 1605 and data 1607 may be stored in the memory 1603. The instructions 1605 may be executable by the processor 1601 to implement some or all of the functionality disclosed herein. Executing the instructions 1605 may involve the use of the data 1607 that is stored in the memory 1603. Any of the various examples of modules and components described herein may be implemented, partially or wholly, as instructions 1605 stored in memory 1603 and executed by the processor 1601. Any of the various examples of data described herein may be among the data 1607 that is stored in memory 1603 and used during execution of the instructions 1605 by the processor 1601.

A computer system 1600 may also include one or more communication interfaces 1609 for communicating with other electronic devices. The communication interface(s) 1609 may be based on wired communication technology, wireless communication technology, or both. Some examples of communication interfaces 1609 include a Universal Serial Bus (USB), an Ethernet adapter, a wireless adapter that operates in accordance with an Institute of Electrical and Electronics Engineers (IEEE) 802.11 wireless communication protocol, a BLUETOOTH® wireless communication adapter, and an infrared (IR) communication port.

A computer system 1600 may also include one or more input devices 1611 and one or more output devices 1613. Some examples of input devices 1611 include a keyboard, mouse, microphone, remote control device, button, joystick, trackball, touchpad, lightpen, and a downhole sensor. Some examples of output devices 1613 include a speaker and a printer. One specific type of output device that is typically included in a computer system 1600 is a display device 1615. Display devices 1615 used with embodiments disclosed herein may utilize any suitable image projection technology, such as liquid crystal display (LCD), light-emitting diode (LED), gas plasma, electroluminescence, or the like. A display controller 1617 may also be provided, for converting data 1607 stored in the memory 1603 into text, graphics, and/or moving images (as appropriate) shown on the display device 1615. In accordance with embodiments of the present disclosure, the input devices 1611 and/or the output devices 1613 may be located at a surface location. In some embodiments, at least one of the memory 1603, instructions 1605, data 1607, processor 1601, or communication interface 1609 may be downhole, such as in the survey tool.

The various components of the computer system 1600 may be coupled together by one or more buses, which may include a power bus, a control signal bus, a status signal bus, a data bus, etc. For the sake of clarity, the various buses are illustrated in FIG. 10 as a bus system 1619.

According to an aspect (A1) a method for stabilizing a gyroscope assembly includes one or more of: rotating a gyroscope assembly to a park position of one or more predetermined park positions; rotating a downhole tool about a longitudinal axis, the downhole tool including the gyroscope assembly; and while rotating the downhole tool, maintaining the gyroscope assembly in the park position.

According to another aspect (A2) that can be combined with any or each aspect described above or below (and any combination thereof), the park position orients a gyroscope of the gyroscope assembly to an orientation that is within 2.5° of perpendicular to the longitudinal axis.

According to another aspect (A3) that can be combined with any or each aspect described above or below (and any combination thereof), the park position orients the gyroscope to an orientation that is within 1° of perpendicular to the longitudinal axis.

According to another aspect (A4) that can be combined with any or each aspect described above or below (and any combination thereof), rotating the gyroscope assembly to the park position includes rotating the gyroscope assembly to the park position while the downhole tool is not rotating.

According to another aspect (A5) that can be combined with any or each aspect described above or below (and any combination thereof), maintaining the gyroscope assembly in the park position includes adjusting a rotational position of the gyroscope assembly while rotating the downhole tool.

According to another aspect (A6) that can be combined with any or each aspect described above or below (and any combination thereof), stabilizing a gyroscope assembly includes maintaining a power connection to the gyroscope assembly while rotating the downhole tool.

According to another aspect (A7) that can be combined with any or each aspect described above or below (and any combination thereof), stabilizing a gyroscope assembly includes determining the one or more predetermined park positions to be park positions that minimize one or more of: bias drift of the gyroscope assembly; overload of the gyroscope assembly while drilling; or alignment of a sensitivity axis of a gyroscope of the gyroscope assembly relative to a line perpendicular to the longitudinal axis.

According to another aspect (A8) that can be combined with any or each aspect described above or below (and any combination thereof), stabilizing a gyroscope assembly includes slowing or stopping rotation of the downhole tool.

According to another aspect (A9) that can be combined with any or each aspect described above or below (and any combination thereof), stabilizing a gyroscope assembly includes, while rotation of the downhole tool is slowing or stopped, unparking the gyroscope assembly and obtaining a survey measurement with the gyroscope assembly.

According to another aspect (A10) that can be combined with any or each aspect described above or below (and any combination thereof), stabilizing a gyroscope assembly includes, after obtaining the survey measurement, returning the gyroscope assembly to one of the one or more predetermined park positions.

According to another aspect (A11) that can be combined with any or each aspect described above or below (and any combination thereof), stabilizing a gyroscope assembly includes resuming rotating the downhole tool.

According to another aspect (A12) that can be combined with any or each aspect described above or below (and any combination thereof), the gyroscope begins obtaining the survey measurement within 5 seconds of stopping rotation of the downhole tool.

According to another aspect (A13) that can be combined with any or each aspect described above or below (and any combination thereof), stabilizing a gyroscope assembly includes calibrating a gyroscope of the gyroscope assembly.

According to another aspect (A14) that can be combined with any or each aspect described above or below (and any combination thereof), calibrating the gyroscope includes determining the one or more predetermined park positions based on misalignment of gyroscope.

According to another aspect (B1) that can be combined with any or each aspect described above or below (and any combination thereof), a gyroscope assembly is housed in a downhole tool and includes any combination of: a shell shaft; an indexable shell rotatable about the shell shaft; a gyroscope in the indexable shell; a processor; and computer-readable media including instructions which, when accessed by the processor, cause the processor to instruct a motor coupled to the gyroscope assembly to rotate the indexable shell to a park position of one or more predetermined park positions and remain in the park position while the downhole tool rotates.

According to another aspect (B2) that can be combined with any or each aspect described above or below (and any combination thereof), in each of one or more park positions, a sensitivity axis of the gyroscope is oriented within 5° of perpendicular to a longitudinal axis of the downhole tool.

According to another aspect (B3) that can be combined with any or each aspect described above or below (and any combination thereof), computer-readable media further include instructions which, when accessed by the processor, cause a processor to monitor an orientation of the gyroscope when the downhole tool is rotating.

According to another aspect (B4) that can be combined with any or each aspect described above or below (and any combination thereof), the instructions are arranged and designed such that, when accessed by the processor, the processor instructs the motor to move the gyroscope assembly from the park position when the downhole tool stops rotating.

According to another aspect (B5) that can be combined with any or each aspect described above or below (and any combination thereof), the instructions are arranged and designed such that, when accessed by the processor, the processor instructs the motor to move the gyroscope assembly and perform a directional survey.

According to another aspect (B6) that can be combined with any or each aspect described above or below (and any combination thereof), the instructions are arranged and designed such that, when accessed by the processor, the processor instructs the motor to, upon completion of the directional survey or upon resumption of rotation of the downhole tool, rotate the indexable shell to a nearest park position of the one or more predetermined park positions.

According to another aspect (B7) that can be combined with any or each aspect described above or below (and any combination thereof) the one or more predetermined park positions are dependent upon a misalignment of a sensitivity axis of the gyroscope.

According to another aspect (C1) that can be combined with any or each aspect described above or below (and any combination thereof), a system for determining downhole direction includes one or more of: a housing having a longitudinal axis, the housing optionally being rotatable about the longitudinal axis during downhole operations; and a gyroscope assembly including one or more of: an indexable shell; a gyroscope located in the shell; and a drive shaft rotatable about the longitudinal axis, the drive shaft including an arm member coupled to the indexable shell, and optionally one or more counter arms that mass balance the drive shaft.

According to another aspect (C2) that can be combined with any or each aspect described above or below (and any combination thereof), one or more counter arms are integrally formed with one or more of a first arm or a drive shaft.

According to another aspect (C3) that can be combined with any or each aspect described above or below (and any combination thereof), a motor is coupled to the drive shaft and configured to rotate the drive shaft.

According to another aspect (C4) that can be combined with any or each aspect described above or below (and any combination thereof), an electronics assembly is coupled to the motor, the electronics assembly storing one or more predetermined park positions for the gyroscope assembly and instructions for maintaining the gyroscope assembly at the one or more predetermined park positions while the housing rotates about the longitudinal axis.

According to another aspect (C5) that can be combined with any or each aspect described above or below (and any combination thereof), the one or more predetermined park positions are each configured to orient a sensitivity axis of the gyroscope at a position that is within 10, 2.5°, or 5° of perpendicular the longitudinal axis.

According to another aspect (C6) that can be combined with any or each aspect described above or below (and any combination thereof), the indexable shell is rotatable relative to the longitudinal axis and a shell axis, and each of the one or more predetermined park positions are specific to a misalignment of the sensitivity axis relative to the shell axis.

According to another aspect (D1) that can be combined with any or each aspect described above or below (and any combination thereof), a system of any of aspects C1 to C6, or any combination thereof, includes a gyroscope assembly of any of aspects B1 to B7, or any combination thereof.

According to another aspect (E1) that can be combined with any or each aspect described above or below (and any combination thereof), method of any of aspects A1 to A14, or any combination thereof, using an assembly or system any of aspects B1 to B7 or C1 to C6, or any combination thereof.

Embodiments of gyroscope assemblies, systems, and methods have been primarily described with reference to wellbore drilling operations; however, the gyroscope assemblies described herein may be used in applications other than the drilling of a wellbore, including in a characterization, surveying, or production application. In other embodiments, gyroscope assemblies according to the present disclosure may be used outside a wellbore or other downhole environment used for the exploration or production of natural resources. For instance, gyroscope assemblies of the present disclosure may be used in a borehole used for placement of utility lines. Accordingly, the terms "wellbore," "borehole" and the like should not be interpreted to limit tools, systems, assemblies, or methods of the present disclosure to any particular industry, field, or environment. Additionally, drilling activities may include any activity performed by a downhole system. For example, drilling activities may include advancing the borehole depth (such as by eroding and/or degrading the formation using a bit at the furthest extent of the wellbore), widening the borehole (e.g., reaming), removing borehole structures (e.g., casing cutting, drilling through a plug/packer), adding a new off-shoot (e.g., redirecting the wellbore with a whipstock), tripping in a wellbore, tripping out of a wellbore, any other downhole activity, and combinations thereof. In some embodiments, drilling operations may include rotating the downhole tool housing for any purpose. In some embodiments, drilling operations include other movements (such as vibrations, jolts, bumps, jostles, fluid injections, perforating charges, etc.) while not rotating a downhole tool.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that is within standard manufacturing or process tolerances, or which still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for stabilizing a gyroscope assembly, comprising:
rotating the gyroscope assembly to a park position of one or more predetermined park positions;
rotating a downhole tool about a longitudinal axis, the downhole tool including the gyroscope assembly;
while rotating the downhole tool, maintaining the gyroscope assembly in the park position;
slowing or stopping rotation of the downhole tool;
while rotation of the downhole tool is slowing or stopped, unparking the gyroscope assembly and obtaining a survey measurement with the gyroscope assembly;
after obtaining the survey measurement, returning the gyroscope assembly to one of the one or more predetermined park positions; and
resuming rotating the downhole tool.

2. The method of claim 1, wherein the park position orients a gyroscope of the gyroscope assembly to an orientation that is within 2.5° of perpendicular to the longitudinal axis.

3. The method of claim 2, wherein the park position orients the gyroscope to an orientation that is within 1° of perpendicular to the longitudinal axis.

4. The method of claim 1, wherein rotating the gyroscope assembly to the park position includes rotating the gyroscope assembly to the park position while the downhole tool is not rotating.

5. The method of claim 1, wherein maintaining the gyroscope assembly in the park position includes adjusting a rotational position of the gyroscope assembly while rotating the downhole tool.

6. The method of claim 1, further comprising maintaining a power connection to the gyroscope assembly while rotating the downhole tool.

7. The method of claim 1, further comprising:
determining the one or more predetermined park positions to be park positions that minimize one or more of:
bias drift of the gyroscope assembly;
overload of the gyroscope assembly while drilling; or
alignment of a sensitivity axis of a gyroscope of the gyroscope assembly relative to a line perpendicular to the longitudinal axis.

8. The method of claim 1, wherein a gyroscope of the gyroscope assembly begins obtaining the survey measurement within 5 s of stopping rotation of the downhole tool.

9. The method of claim 1, further comprising:
calibrating a gyroscope of the gyroscope assembly, wherein calibrating the gyroscope includes determining the one or more predetermined park positions based on misalignment of the gyroscope.

10. A system for determining downhole direction, comprising:
a housing having a longitudinal axis, the housing being rotatable about the longitudinal axis during downhole operations; and
a gyroscope assembly, the gyroscope assembly including:
an indexable shell;
a gyroscope located in the indexable shell; and
a drive shaft rotatable about the longitudinal axis, the drive shaft including:
an arm member coupled to the indexable shell; and
one or more counter arms that mass balance the drive shaft.

11. The system of claim 10, wherein the one or more counter arms are integrally formed with one or more of the arm member or the drive shaft.

12. The system of claim 10, further comprising:
a motor coupled to the drive shaft and configured to rotate the drive shaft; and
an electronics assembly coupled to the motor, the electronics assembly storing one or more predetermined park positions for the gyroscope assembly and instructions for maintaining the gyroscope assembly at the one or more predetermined park positions while the housing rotates about the longitudinal axis.

13. The system of claim 12, the one or more predetermined park positions each being configured to orient a sensitivity axis of the gyroscope at a position that is within 5° of perpendicular to the longitudinal axis.

14. The system of claim 13, the indexable shell being rotatable relative to the longitudinal axis and a shell axis, and each of the one or more predetermined park positions is specific to a misalignment of the sensitivity axis relative to the shell axis.

15. A method for stabilizing a gyroscope assembly, comprising:
calibrating a gyroscope of the gyroscope assembly, wherein calibrating the gyroscope includes determining one or more predetermined park positions based on misalignment of the gyroscope;
rotating the gyroscope assembly to a park position of the one or more predetermined park positions;
rotating a downhole tool about a longitudinal axis, the downhole tool including the gyroscope assembly; and
while rotating the downhole tool, maintaining the gyroscope assembly in the park position.

16. The method of claim 15, wherein the park position orients the gyroscope of the gyroscope assembly to an orientation that is within 2.5° of perpendicular to the longitudinal axis.

17. The method of claim 15, wherein rotating the gyroscope assembly to the park position includes rotating the gyroscope assembly to the park position while the downhole tool is not rotating.

18. The method of claim 15, wherein maintaining the gyroscope assembly in the park position includes adjusting a rotational position of the gyroscope assembly while rotating the downhole tool.

19. The method of claim 15, further comprising maintaining a power connection to the gyroscope assembly while rotating the downhole tool.

20. The method of claim 15, further comprising:
determining the one or more predetermined park positions to be park positions that minimize one or more of:
bias drift of the gyroscope assembly;
overload of the gyroscope assembly while drilling; or
alignment of a sensitivity axis of the gyroscope of the gyroscope assembly relative to a line perpendicular to the longitudinal axis.

* * * * *